US011508376B2

(12) United States Patent
Nitz et al.

(10) Patent No.: US 11,508,376 B2
(45) Date of Patent: *Nov. 22, 2022

(54) PROVIDING VIRTUAL PERSONAL ASSISTANCE WITH MULTIPLE VPA APPLICATIONS

(71) Applicant: SRI International, Menlo Park, CA (US)

(72) Inventors: Kenneth C. Nitz, Redwood City, CA (US); Patrick D. Lincoln, Woodside, CA (US)

(73) Assignee: SRI International, Menlo Park, CA (US)

(*) Notice: Subject to any disclaimer, the term of this patent is extended or adjusted under 35 U.S.C. 154(b) by 467 days.

This patent is subject to a terminal disclaimer.

(21) Appl. No.: 16/234,356

(22) Filed: Dec. 27, 2018

(65) Prior Publication Data

US 2019/0130915 A1 May 2, 2019

Related U.S. Application Data

(63) Continuation of application No. 13/966,665, filed on Aug. 14, 2013, now Pat. No. 10,204,627.

(60) Provisional application No. 61/812,698, filed on Apr. 16, 2013.

(51) Int. Cl.
*G10L 15/30* (2013.01)
*G10L 15/22* (2006.01)
*G10L 15/32* (2013.01)
*G10L 15/18* (2013.01)
*G06Q 30/06* (2012.01)

(52) U.S. Cl.
CPC .............. *G10L 15/30* (2013.01); *G06Q 30/06* (2013.01); *G10L 15/1822* (2013.01); *G10L 15/22* (2013.01); *G10L 15/32* (2013.01)

(58) Field of Classification Search
CPC ....................................................... G10L 15/30
See application file for complete search history.

(56) References Cited

U.S. PATENT DOCUMENTS

| 7,013,275 | B2 | 3/2006 | Arnold et al. |
| 7,016,849 | B2 | 3/2006 | Arnold et al. |
| 7,228,275 | B1 | 6/2007 | Endo |
| 7,328,159 | B2 * | 2/2008 | Chang ..................... G10L 15/22 704/233 |
| 7,890,324 | B2 | 2/2011 | Bangalore |
| 8,386,260 | B2 | 2/2013 | Engelsma et al. |

(Continued)

FOREIGN PATENT DOCUMENTS

| WO | WO2001/069400 | 9/2001 |
| WO | WO2001/069427 | 9/2001 |

(Continued)

OTHER PUBLICATIONS

Nitz, U.S. Appl. No. 13/966,665, filed Aug. 14, 2013, Office Action, dated May 16, 2018.

(Continued)

*Primary Examiner* — Shaun Roberts
(74) *Attorney, Agent, or Firm* — Moser Taboada

(57) ABSTRACT

The activities of multiple virtual personal assistant (VPA) applications are coordinated. For example, different portions of a conversational natural language dialog involving a user and a computing device may be handled by different VPAs.

21 Claims, 9 Drawing Sheets

(56) References Cited

U.S. PATENT DOCUMENTS

| | | |
|---|---|---|
| 9,015,099 B2 | 4/2015 | Nitz et al. |
| 9,081,411 B2 | 7/2015 | Kalns et al. |
| 9,082,402 B2 | 7/2015 | Yadgar et al. |
| 9,085,303 B2 | 7/2015 | Wolverton et al. |
| 9,489,625 B2 | 11/2016 | Kalns et al. |
| 9,798,799 B2 | 10/2017 | Wolverton et al. |
| 9,805,718 B2 | 10/2017 | Ayan et al. |
| 2001/0041980 A1 | 11/2001 | Howard |
| 2001/0047258 A1 | 11/2001 | Rodrigo |
| 2004/0155784 A1 | 8/2004 | Candela |
| 2004/0162882 A1 | 8/2004 | Mora |
| 2004/0166832 A1 | 8/2004 | Portman |
| 2006/0048061 A1 | 3/2006 | Forlenza |
| 2006/0271695 A1 | 11/2006 | Lavian |
| 2007/0043574 A1 | 2/2007 | Coffman |
| 2007/0200920 A1 | 8/2007 | Walker |
| 2009/0164441 A1 | 6/2009 | Cheyer |
| 2010/0161336 A1 | 6/2010 | Czahor |
| 2011/0112827 A1 | 5/2011 | Kennewick |
| 2012/0245934 A1 | 9/2012 | Talwar |
| 2012/0265528 A1 | 10/2012 | Gruber |
| 2013/0132094 A1 | 5/2013 | Lim |
| 2013/0152092 A1 | 6/2013 | Yadgar et al. |
| 2013/0197907 A1 | 8/2013 | Burke et al. |
| 2013/0238326 A1 | 9/2013 | Kim |
| 2013/0311166 A1 | 11/2013 | Yanpolsky |
| 2014/0039893 A1 | 2/2014 | Weiner et al. |
| 2014/0052680 A1 | 2/2014 | Nitz et al. |
| 2014/0052681 A1 | 2/2014 | Nitz et al. |
| 2014/0136013 A1 | 5/2014 | Wolverton et al. |
| 2014/0136187 A1 | 5/2014 | Wolverton et al. |
| 2014/0310002 A1 | 10/2014 | Nitz et al. |
| 2014/0316764 A1 | 10/2014 | Ayan et al. |
| 2014/0337266 A1 | 11/2014 | Kalns et al. |
| 2014/0337814 A1 | 11/2014 | Kalns et al. |

FOREIGN PATENT DOCUMENTS

| | | |
|---|---|---|
| WO | WO2001/069449 | 9/2001 |
| WO | WO2011/028844 | 3/2011 |

OTHER PUBLICATIONS

Nitz, U.S. Appl. No. 13/966,665, filed Aug. 14, 2013, Notice of Allowance, dated Oct. 31, 2018.

Nitz, U.S. Appl. No. 13/966,665, filed Aug. 14, 2013, Final Office Action, dated Aug. 28, 2017.

Williams, et al., "Speed and the Automating the Connections Between Humans and Machines in the API Economy", dated 2013.

Williams et al., "Facebook and the Sudden Wake Up About the APE Economy", dated 2013.

Scheffer, Nicholas et al., "Multi-Sample Conversational Voice Verification", dated Jul. 27, 2017.

Scheffer, Nicholas et al., "Method and Apparatus for Generating Speaker-Specific Spoken Passwords", dated Dec. 21, 2011.

Fitchard, Kevin, "Spain's SIRI-Challenger Sherpa Learns English, Arrives in the U.S.", dated 2013.

Deutsch et al., "Querying XML Data" dated 1999, IEEE Computer Sociery Technical Committee on Data Engineering pp. 1-9.

\* cited by examiner

PROVIDING VIRTUAL PERSONAL ASSISTANCE WITH MULTIPLE VPA APPLICATIONS

CROSS-REFERENCE TO RELATED APPLICATION

This application claims the benefit as a Continuation of application Ser. No. 13/966,665, filed Aug. 14, 2013; which claims priority to U.S. Provisional Patent Application Ser. No. 61/812,698, filed Apr. 16, 2013, each of which is incorporated by reference herein in its entirety. The Applicant hereby rescinds any disclaimer of claim scope in the parent applications or the prosecution history thereof and advises the USPTO that the claims in this application may be broader than any claim in the parent applications.

BACKGROUND

Computerized systems commonly known as virtual personal assistants ("VPAs") can interact with computing device users in a conversational manner to provide access to electronic information and services. To do this, the VPA needs to be able to correctly interpret conversational user input, execute a task on the user's behalf, determine an appropriate response to the input, and present system output in a way that the user can readily understand and appreciate as being responsive to the input. A complex assortment of software components work together to accomplish these functions.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
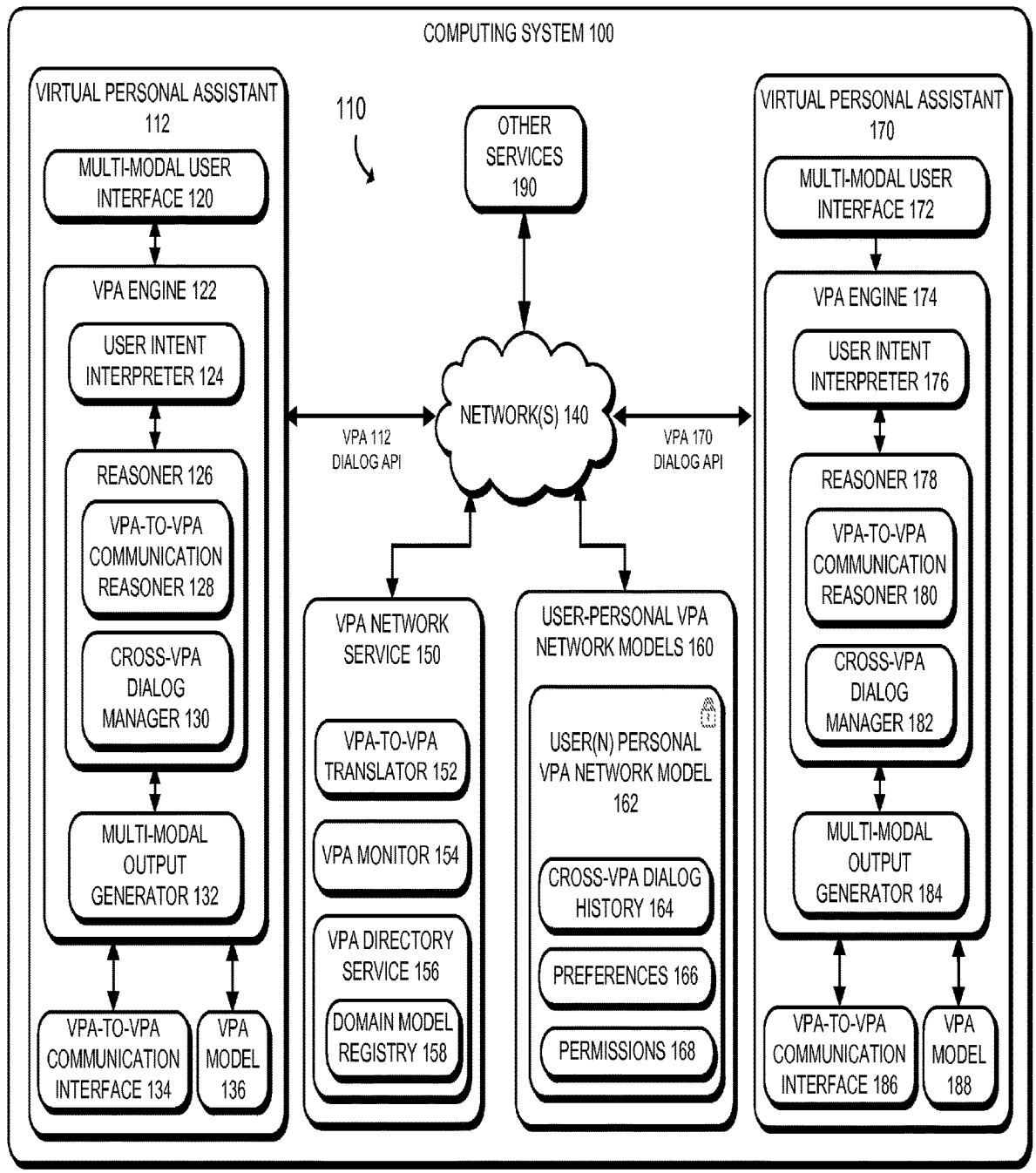
FIG. 1 is a simplified module diagram of at least one embodiment of a virtual personal assistant ("VPA") network embodied in a computing system as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

The acceptance and continued use of virtual personal assistant (VPA) applications is likely to increase, especially if the assistance provided by the VPA can be seamlessly tailored to the needs and preferences of particular users across a wide range of general topics and more deeply into specific topics of interest. Many existing systems that attempt to provide a VPA-like experience are unable to continue a dialog with the user if the user wishes the conversation to dive deeper into specific subject areas. For example, an existing system may be able to tell the user the results of last night's baseball game, but will not be able to answer specific follow-up questions regarding the game highlights. As another example, an existing system may be able to provide the location of a clothing store, but will not be able to converse about specific clothing details such as style, price, and availability, let alone execute a purchase transaction for a specific item. In such situations, existing systems may typically respond by asking the user a generic question such as, "would you like me to search for _____?" When this happens, the user is likely to abandon the conversation with the VPA in favor of a more traditional web query.

Moreover, as VPA applications proliferate, the user experience is likely to be enhanced if the operations of multiple VPAs can be coordinated in a way that is transparent to the user. For instance, domain-specific VPAs may be individually deployed on company web sites, such as banking sites or clothing stores. If the user begins a conversation with the banking VPA to deposit a newly received paycheck, and then wishes to shop for new clothing using the newly deposited funds, it would be desirable for the banking VPA and the clothing store VPA to cooperate so as to allow the user to continue the conversation rather than having to "start over" with the clothing store VPA. In some cases, users may wish to continue a conversation started on one electronic device (such as a car, phone, or wearable-device VPA) and finish the conversation on another device (e.g., a tablet, laptop, or desktop computer). Further, in some instances, a user's dialog session with a VPA may be accelerated if the user's VPA can pair with another person's VPA.

As disclosed in the aforementioned U.S. Provisional Patent Application Ser. No. 61/812,698 and herein, VPAs can be selectively paired or coupled with other VPAs to, among other things, facilitate the continuity of dialog across and within various topics of conversation, and to accelerate user-VPA dialog interactions by sharing dialog and/or other information between or among the multiple VPAs. For example, a user's VPA may learn information gleaned from the user's dialog with another VPA, such as demographic information or specific user preferences, which the user's VPA may recall and incorporate into a subsequent dialog with the user. In some cases, the user's VPA may "pre-fill" such learned information into a subsequent transaction initiated by the VPA or establish a re-occurring transaction for the user based on the learned information.

Enabling VPAs to communicate with one another and to act cooperatively in interpreting the user's natural language dialog can result in a more seamless use of a VPA. Such cooperation may also increase the use of websites that are configured with VPA technologies. When VPAs interact cooperatively, the user may, for example, initiate a conversation with his or her own familiar, personal VPA, which may in turn communicate with a particular web-based VPA and/or other VPAs. In this way, the VPAs can share/blend their dialog operations, resulting in an integrated and more pleasurable user experience.

Referring now to FIG. 1, a simplified module-level depiction of an embodiment of a VPA network 110 embodied in a computing system 100 is shown. Ilustratively, the VPA network 110 includes VPAs 112, 170, a VPA network service 150, a number of user-personal VPA network models 160, and a number of other services 190. Each of the components 112, 170, 150, 160, 190 is communicatively coupled to one or more networks 140. As discussed in detail below, the VPAs 112, 170 may communicate with each other over one or more of the networks 140. In doing so, the VPAs 110, 170 may utilize the VPA network service 150 and/or user-personal VPA network models 160 to appropriately verify and structure the VPA-to-VPA communications.

The illustrative VPA 112 includes, among other computer-executable components, a multi-modal user interface 120, a VPA engine 122, a VPA-to-VPA communication interface 134, and a VPA model 136. Illustratively, the VPA 170 is configured in a similar fashion as the VPA 112, although this need not be the case. For instance, the VPAs 112, 170 may be provided by the same vendor or different vendors, may reside on the same computing device or different devices, and may have the same or different scope or applications (e.g., general purpose or a specific purpose). Each of the VPAs 112, 170 and their various components may be embodied as computer software, firmware, and/or hardware in the computing system 100. The computing system 100 may include one or more multiple computing devices (e.g., communicating over a network) as described more fully below with reference to FIGS. 10-11. While only two VPAs are shown in the illustration of FIG. 1, it should be appreciated that any number of VPAs may be coupled to the network(s) 140 in various embodiments of the VPA network 110.

As described in more detail below, each of the VPAs 112, 170 is configured to receive user-supplied conversational natural language dialog inputs (alone or in combination with other inputs, as discussed below), interpret the inputs, execute one or more system operations (e.g., task flows) based on the VPA's interpretation of the inputs, and supply a response to the inputs as a result of the executed system operations, where the response may include, among other things, system-generated natural language dialog outputs. Moreover, some embodiments of the VPAs 112, 170 are configured to sustain multiple rounds of dialog conversation with the user about a specific topic or covering multiple different topics, while executing various system operations to provide information and/or services to the user through the user's computing device to accomplish a goal or objective on behalf of the user.

As used herein, "natural language" may refer to words, phrases, verbal expressions, and/or combinations thereof, which are formulated by a human, device, or system in a fashion that is or is intended to approximate or simulate speech that normally arises in an unpremeditated fashion as the result of the innate facility for language possessed by the human intellect (as distinguished from, for example, structured computer programming languages or code). As used herein, terms such as "dialog" and "conversation" generally refer to the use of natural language (e.g., spoken or written) in the context of a communicative exchange of information, ideas, opinions, sentiments, observations, questions and answers, statements and responses, or the like, involving a user and a computing device.

As used herein, "communicative exchange" may refer to a user's natural language dialog input and the corresponding system output formulated by the VPA 112, 170 in response to the dialog input. For example, a communicative exchange may involve a user asking, "How hot is it outside?" and the VPA 112, 170 responding, "It is currently ninety-eight degrees Fahrenheit." Of course, in some instances, the VPA 112, 170 may respond to the dialog input by performing an action that does not involve the presentation of system output to the user. For example, the user may request the VPA 112, 170 to schedule a meeting at a particular day/time on the user's schedule and may have established a preference indicating that the VPA 112, 170 should simply schedule the event and provide no feedback to the user.

An "intent" as used herein generally refers to a structured representation of the VPA 112, 170's interpretation of the user's natural language dialog input. For example, an intent may include semantically meaningful information about the user's natural language dialog input as well as contextual information contained in or derived from other inputs (e.g., sensor inputs), which the VPA 112, 170 can understand and process in order to invoke another VPA 112, 170 on the user's behalf, or to execute some other action to fulfill the user's intended goal or objective as expressed by the user through the dialog input.

Terms such as "goal" and "objective" are used herein to convey that the VPAs 112, 170 attempt to determine not only what the words of the user's conversational natural language dialog input mean, but the user's actual intended goal or objective, which he or she used those words to express. To do this, the VPA may need to consider the dialog context and/or other aspects of the user's current context. As an example, the user might say something like "I need ten" or "get me that one," which really means that the user's goal is to withdraw ten dollars from the bank, or to buy a certain product, where the product may have been identified by the system through other multi-modal inputs (such as a tap selecting an on-screen graphic). Determining the intended goal or objective of a user's natural language dialog can involve the application of artificial-intelligence based methods and systems by the VPAs 112, 170.

It should be appreciated that each VPA 112, 170 may operate based on one or more particular domains that are predefined in their respective VPA models 136, 188. As such, the VPA 112, 170's interpretation of the user's dialog may vary depending on the scope of its VPA model 136, 188. For example, an e-commerce VPA may attempt to interpret user intents consistent with a number of predefined user intents such as "search product," "get product details," and "confirm purchase," whereas a health-information VPA may interpret user intents such as "search symptoms," "get adverse events," and "contact physician," and a financial services VPA may interpret user intents such as "transfer funds," "check balance," and the like. For case of discussion, the VPAs 112, 170 and their illustrated components are described below with reference to the VPA 112.

The illustrative VPA 112 can receive (e.g., via the multi-modal user interface 120) and utilize a number of different forms of input, including human natural language dialog inputs (e.g., spoken or textual words and phrases), non-dialog human-generated inputs (e.g., non-dialog keyboard, keypad, or touch screen inputs, mouse clicks, gestures, and/or others), computer application inputs (e.g., data and/or instructions passed by another computer application to the VPA 112, through an application programming interface, for example), and sensor inputs (e.g., electrical signals embodying sensed information such as geographic location, motion, temperature, activity, biometric data, etc.).

In some embodiments, access to a particular VPA 112, 170 may require user authentication. User authentication parameters may be defined, for example, in a user-personal VPA model 160 as described in more detail below. Accordingly, in some embodiments, the multi-modal user interface 120 may perform authentication processes to verify a user's identity. For example, the user's identity may be verified using voice biometrics as disclosed in, for example, Scheffer et al., U.S. patent application Ser. No. 13/358,900, filed Jul. 27, 2012 and entitled "Multi-Sample Conversational Voice Verification;" and Scheffer, U.S. patent application Ser. No. 13/333,020, filed Dec. 21, 2011 and entitled "Method and Apparatus for Generating Speaker-Specific Spoken Passwords," both of which are incorporate herein by this reference in their entirety.

In some embodiments, the multi-modal user interface 120 captures the user's spoken natural language dialog input with a microphone or other audio input device of the computing system 100. Alternatively or in addition, the multi-modal user interface 120 captures text-based natural language dialog input by, for example, a touch pad, key pad, or touch screen of the computing system 100. Other (e.g., non-natural language dialog) user inputs also may be captured by a touch pad, keypad, touch screen, or other input device, through the multi-modal user interface 120. Such inputs may include, for example, mouse clicks, taps, swipes, pinches, and/or others. In some cases, the multi-modal interface 120 may capture "off-device" body movements or other gesture-type inputs (such as hand waves, head nods, eye movements, etc.) by, e.g., a camera, motion sensor and/or kinetic sensor, which may be integrated with or otherwise in communication with the computing system 100. In any event, the captured user inputs are at least temporarily stored in memory of the computing system 100. While the VPA 112 is often mainly concerned with processing the natural language (NL) dialog inputs, any or all of the other forms of user inputs may be used by the VPA 112 to aid in its understanding of the NL dialog inputs, to determine the intent of the NL dialog inputs, to determine a suitable response to the NL dialog inputs, or for other reasons.

Machine-executable components of the multi-modal user interface 120 process the various inputs and provide machine-readable representations of such inputs to the VPA engine 122. For example, components of the multi-modal user interface 120 may convert analog signals to digital form, translate mouse clicks or gestures to a text command or data, or resolve data and/or instructions received from other computer applications according to conversion specifications using, for example existing or readily available techniques.

In the case of spoken natural language dialog inputs, an automated speech recognition (ASR) module generally processes the natural language audio and generates a machine-readable version of the user's speech that can be further analyzed by the user intent interpreter 124. Typically, an ASR system identifies spoken words and/or phrases in verbal natural language dialog inputs and recognizes and converts them into text form. There are many ASR systems commercially available; one example is the DYNASPEAK system, available from SRI International. Depending on the embodiment, the ASR system may be embodied as a component of the multi-modal user interface 120, as a component of an external (e.g. third party) system with which the VPA 112 communicates, or incorporated into the VPA engine 122 (e.g., as a component of the user intent interpreter 124).

The multi-modal user interface 120 is in communication with the VPA engine 122 by one or more software, hardware, or firmware communication mechanisms (e.g., a computer programming construct, an API, a bus, a network connection, or other type of wired or wireless signal path or paths). In general, the VPA 112 and more specifically the VPA engine 122 include a number of computer-executable components that work together and communicate with each other and with the multi-modal user interface 120, the VPA-to-VPA communication interface 134, and various portions of the VPA model 136 from time to time as needed using suitable electronic communication mechanisms (such as any of those mentioned above) to conduct conversational natural language dialog sessions with the user.

The VPA engine 122 receives and processes the inputs captured by the multi-modal user interface 120. When the VPA engine 122 receives an instance of natural language dialog user input, the user intent interpreter 124 analyzes the input and formulates therefrom a likely intended goal or objective of the user, which it passes to the reasoner 126 (e.g., in the form of an input intent). The reasoner 126 analyzes the input intent and executes any system operations (e.g., task flows) that are needed to prepare a system response to the input intent. The illustrative reasoner 126 generates a structured representation of the VPA's response to the input intent (e.g., a fulfillment of the user's likely intended goal or objective as expressed by the NL dialog input), which may be referred to as an "output intent," and passes the output intent to the multi-modal output generator 132.

In more detail, the user intent interpreter 124 analyzes the words and/or phrases produced by the ASR system (i.e., generated based on the users NL dialog) and determines a meaning most likely intended by the user given, for example, other words or phrases presented by the user during the dialog session with the VPA 112. For instance, the user intent interpreter 124 may apply a rule-based parser and/or a statistical parser to determine, based on the verbal context, the likely intended meaning of words or phrases that have multiple possible definitions (e.g., the word "pop" could mean that something has broken, may refer to a carbonated beverage, or may be the nickname of a person, depending on the context, including the surrounding words and/or phrases of the current dialog input, previous rounds of dialog, and/or other multi-modal inputs). A hybrid parser may arbitrate between the outputs of the rule-based parser and the statistical parser to determine which of the outputs has the better confidence value. An illustrative example of a natural language understanding component that may be used in connection with or as a component of the user intent interpreter 124 is the SRI Language Modeling Toolkit, available from SRI International.

In some embodiments, non-dialog human inputs, computer application inputs, and/or sensor inputs may be used by the VPA engine 122 to supply contextual information for the interpretation of the NL dialog inputs. In other words, the user intent interpreter 124 may "merge" the contextual information obtained from such other inputs with its interpretation of the user's NL dialog input, to arrive at a "final" user intent. Some examples of VPAs, multi-modal user interfaces, intents, intent merging, and/or "context aware" systems are described in other patent applications of SRI International, for example, Tur et al., PCT International Application Publication No. WO 2011/028833, entitled "Method and Apparatus for Tailoring Output of an Intelligent Automated Assistant to a User;" Yadgar et al., U.S. patent application Ser. No. 13/314,965, filed Dec. 18, 2011, entitled "Generic Virtual Personal Assistant;" Nitz et al., U.S. patent application Ser. Nos. 13/585,003 and 13/585,008, filed Aug. 14, 2012, both entitled "Method, System, and Device for Inferring a Mobile User's Context and Proactively Providing Assistance;" Wolverton et al., U.S. patent application Ser. Nos. 13/678,209 and 13/678,213, filed Nov. 15, 2012, both entitled "Vehicle Personal Assistant," Ayan et al., U.S. patent application Ser. No. 13/866,509, filed Apr. 19, 2013, entitled "Clarifying Natural Language Input Using Targeted Questions," and Kalns et al., U.S. patent application Ser. No. 13/954,613, filed Jul. 30, 2013, entitled "Using Intents to Analyze and Personalize a User's Dialog Experience with a Virtual Personal Assistant." However, this disclosure is not limited by any of the foregoing, and any suitable methods or techniques may be included in the VPA 112 and/or otherwise utilized by the VPA 112 in accordance with the requirements of a particular design.

As indicated above, the reasoner 126 generally synthesizes the input intent and/or any of the other available inputs in view of applicable dialog models, business logic, rules, etc., which may be supplied by one or more components of the VPA model 136. From this analysis, the reasoner 126 determines and initiates the execution of a likely appropriate task flow or "work flow" (e.g., a system operation or series of system operations, such as an online transaction) to execute on the user's behalf and/or a likely appropriate system response to the user's intended goal or objective as derived from the meaning of the user inputs and reflected in the input intent (where "likely appropriate" may refer to a computed statistical measure of confidence determined and/or evaluated by the reasoner 126). In some cases, the likely appropriate system task flow may include performing a requested action on the computing system 100 (e.g., schedule a meeting on the user's electronic calendar, determine and output the location of the nearest gas station, display search results, etc.), whereas in other cases, an appropriate system task flow or response may include presenting information to the user in order to elicit from the user additional inputs that may help the VPA engine 122 clarify the input intent.

Once the reasoner 126 has determined an appropriate course of action by which to respond to the user's natural language dialog inputs, and based on the results of the execution of the initiated task flows, the reasoner 126 communicates an output intent to the multi-modal output generator 132. The output intent specifies the type of system output that the reasoner 126 believes (e.g., has a high degree of statistical confidence) is likely appropriate in response to the input intent. For example, if the input intent is to search for a product, the reasoner 126 may determine by executing various task flows and/or conducting other artificial intelligence-based reasoning activities that an appropriate output intent may be to recommend one or more pieces of jewelry to the user, which results in system output that includes an audio or visual presentation by the computing system 100 of a product recommendation for jewelry.

The illustrative multi-modal output generator 132 includes a natural language generator (NLG) module. If the reasoner 126 specifics that the system output is to be presented in a (system-generated) natural-language format, the NLG module may be used to generate a natural language version of the output that satisfies the output intent. To do so, the NLG module may map the output intent to one or more NL responses. In some embodiments, the NL responses may be embodied as generic or domain-specific templates for system-generated natural language output, including parameters representing fields in which specific data values may be inserted. For example, an NL response may include the phrase "Would you like to view the customer reviews for the <product>?"), where <product> indicates a parameter that may be replaced with a data value obtained or derived from the user's NL input. A speech synthesizer or text-to-speech (TTS) module may be used to convert natural-language text generated by the natural-language generator (or even the un-processed output) to speech (e.g., machine-produced speech using a human or humanlike voice), and played through a speaker of the computing system 100, when such an output is appropriate given the output intent generated by the reasoner 126. Alternatively or additionally, the system output may include visually-presented material (e.g., text, graphics, or video), which may be presented on a display screen of the computing system 100, by tactile notifications, and/or other forms of output.

As shown in the illustrative embodiment, the reasoner 126 includes, among other machine-executable (e.g., computer-executable) components, a VPA-to-VPA communication reasoner 128 (hereinafter "the communication reasoner 128") and a cross-VPA dialog manager 130. In some embodiments, the communication reasoner 128 and the cross-VPA dialog manager 130 may cooperate with, e.g., the corresponding components 180, 182 of the VPA 170, to automatically coordinate portions of the user's dialog session conducted by the VPA 112 and the VPA 170; that is, without requiring the user to explicitly take action to invoke the VPA 170 or transfer the dialog to the VPA 170. In general, the components 128, 130, 180, 182, in combination with the VPA network service 150 and the network models 160, operate "behind the scenes" to manage a dialog session across the multiple VPAs 112, 170; that is, in a way that is generally transparent to the user. In other embodiments, the VPAs 112, 170 may seek explicit approval or confirmation from the user prior to invoking another VPA or transferring a dialog session to another VPA. In still other embodiments, the VPAs 112, 170 may utilize a combination of methods for managing a dialog across multiple VPAs. For example, the VPAs 112, 170 may autonomously effectuate a dialog transfer in some contexts or scenarios, but ask the user for permission in other instances.

As described in more detail below, the communication reasoner 128 may be invoked to determine whether the VPA 112 should communicate with another VPA (e.g., the VPA 170) to assist with the current dialog session or to have another VPA conduct a portion of the dialog session. In some cases, the communication reasoner 128 may determine whether the reasoner 126 is able to determine an appropriate course of action (e.g., a task flow to perform or output to generate) based on the received NL dialog input and/or the input intent. For example, the reasoner 126 may synthesize the user's natural language dialog input and/or the input intent to the extent possible based on the particular domain of the VPA 112. The communication reasoner 128 may determine that another VPA may be helpful or needed to further interpret, clarify, synthesize, or otherwise handle the input intent or, more generally, the user's NL dialog and/or other inputs. In some cases, the communication reasoner 128 may determine whether the reasoner 126 is able to generate an appropriate output intent in response to the NL dialog input and/or the input intent.

If the reasoner 126 is not able to interpret all or a portion of the user's NL dialog input, or for other reasons, the communication reasoner 128 may determine another VPA to assist with the natural language dialog session. The VPA engine 122 may communicate with another VPA (e.g., the VPA 170) via the VPA-to-VPA communication interface 134 (hereinafter "the communication interface 134") so as to have the other VPA (e.g., the VPA 170) evaluate the NL dialog input originally received by the VPA 112 and/or the input intent generated by the reasoner 126. Depending on the particular embodiment or based on circumstances recognized by the communication reasoner 128, the VPA 112 may transmit the input intent, the parsed user input, and/or the "raw" natural language dialog input, or portions thereof, to another VPA (e.g., the VPA 170) for evaluation and/or further processing. The information transmitted to other VPAs may also include a VPA-specific identifier identifying the source/sender of the VPA-to-VPA communication (such as an IP or MAC address). Thereafter, the other VPA (e.g., the VPA 170) may interpret and/or reason over a portion of the transmitted information to determine an output intent, if possible, and transmit the output intent back to the VPA 112 and/or render an output directly to the user. In some embodiments, the VPA 112 may update the VPA model 136 or otherwise store the output intent based on the analysis performed by the VPA 170.

Also as shown in the illustrative embodiment, the reasoner 126 comprises a cross-VPA dialog manager 130, which keeps track of the current state and flow of each conversation or dialog session that occurs between the user and the VPA 112, including dialog sessions that involve other VPAs. More particularly, the cross-VPA dialog manager 130 keeps track of dialog transitions between the VPA 112 and other VPAs. For example, the cross-VPA dialog manager 130 may apply dialog-managing rules, templates, and/or task flows to determine when a conversation or a portion thereof has started or ended at the VPA 112 or another VPA (e.g., the VPA 170), or for determining whether a current dialog input is related to other inputs that have been handled by the VPA 112 or by other VPAs.

In some embodiments, the cross-VPA dialog manager 130 may maintain a state table or another suitable data structure to track dialog requests and their current status over time. A dialog request may be considered "incomplete" if, for example, ambiguities in the user's dialog input have not been resolved or a response to the user's dialog input is still pending. A dialog request may be considered "complete" once a VPA has, in response to the dialog request, executed an appropriate task flow, generated an output intent, or presented output to the user or to the requesting VPA. Some techniques for managing dialog flow involving complete and incomplete portions of the dialog are described in, for example, the following patent application of SRI International: Kalns, et al., U.S. patent application Ser. No. 13/954,613, filed Jul. 30, 2013, entitled "Using Intents to Analyze and Personalize a User's Dialog Experience with a Virtual Personal Assistant." In some embodiments, the cross-VPA dialog manager 130 may obtain dialog information from other VPAs handling other portions of a dialog session, or may periodically consult the cross-VPA dialog history 164, or communicate with the VPA monitor 154, to obtain such information. Accordingly, the cross-VPA dialog manager 130 may coordinate information from a variety of different sources and/or entities to monitor the flow and status of a dialog session across multiple VPAs based on such information. While the cross-VPA dialog manager 130 is illustrated as a component of the reasoner 126, it may be embodied as a separate component of the VPA engine 122 or the VPA 112, as a component of the VPA network service 150, or as another component coupled to the VPA network 110, in various embodiments of the computing system 100.

Although there could be any number of reasons for the communication reasoner 128 to request the assistance of or transfer the handling of a dialog session to another VPA (e.g., from the reasoner 126 of the VPA 112 to the reasoner 178 of the VPA 170), a typical scenario may involve the use of VPAs having different domains. As discussed above, different VPAs may have different predefined domains (e.g., generic, banking, healthcare, sports, etc.). Accordingly, a banking or general-purpose VPA may not be able determine an appropriate task flow or output for user inquiries related to other domains. For example, a general-purpose VPA may not be able to interpret domain-specific jargon or terminology relating to specific sports (e.g., "southpaw," "no-no," "WHIP," "the cycle," etc. for baseball) or domain-specific terminology relating to, for instance, legal, technical, or medical topics.

As another example, different e-commerce web sites may have their own VPAs. Allowing the different e-commerce VPAs to communicate may facilitate e-commerce transactions in that shipping information, billing information, payment information, and other "general" information may be shared by one VPA with another VPA, so that the user need not re-supply this information each time a new VPA is invoked. For instance, if the user is engaged with a sporting goods store's VPA to order a gift, and has previously used an electronics store's VPA to buy gifts or other items, and the user tells the sporting goods store's VPA to "send this to my brother Rick by Tuesday," the sporting goods store VPA may know or learn from the user's past dialog history (e.g., the cross-VPA dialog history 164) all of the payment and shipping information it needs to fulfill the user's request, without having to ask the user any follow-up questions. In this case, the sporting goods store VPA may simply review or confirm such information with the user and ask for confirmation, before proceeding with the transaction. Of course, the same principles may be applied to other types of VPAs, alternatively or in addition to e-commerce VPAs.

The communication reasoner 128 may use any suitable criteria for selecting an appropriate VPA with which to pair the VPA 112 in order to handle all or a portion of a dialog with the user. For example, the communication reasoner 128 may consult the user's personal VPA network model 160 for information relating to or derived from the user's cross-VPA dialog history 164, user-specific preferences 166, and/or user permissions 168.

The communication reasoner 128 may recognize the need to invoke the services of another VPA at any point in the analysis of the user's natural language dialog input (e.g., based on a lack of information in the corresponding VPA model 136). Although the communication reasoner 128 is illustratively embodied as a component of the reasoner 126, in some embodiments, the communication reasoner 128 is able to make a determination to communicate with another VPA (e.g., the VPA 170) regarding the user input at any stage in the handling of the natural language dialog by the VPA engine 122 (e.g., during the interpretation, reasoning, or output stages).

As discussed below, the VPA-to-VPA communication interface 134 is configured to facilitate communication between the VPA 112 and other VPAs (e.g., the VPA 170). Additionally, the communication interface 134 may communicate with a VPA network service 150 to determine which VPA to select for a particular dialog and/or to retrieve requisite pairing information for a selected VPA. In some embodiments, the communication interface 134 transmits a message to the selected VPA (e.g., the VPA 170) in the form of a dialog request message. In addition to a VPA-specific identifier identifying the sending VPA, the dialog request message may include the input intent, the actual dialog string, and/or other information relevant to the interpretation and/or reasoning of the user's NL dialog input. In some cases, only the input intent may be passed to the selected VPA. However, in other cases (e.g., where the VPA 112 cannot fully interpret the user's natural language dialog input), the dialog request may include the NL dialog input or at least the ambiguous portion of such input.

The VPA model 136 generally includes the mechanisms used by the VPA engine 122 to conduct a natural language dialog session with the user. In other words, the VPA model 136 provides the tools that the VPA engine 122 uses to interpret and respond to user-supplied natural language dialog inputs. The illustrative VPA model 136 may include NL grammars, vocabularies, input intents, task flows, output intents, and NL responses. In general, each or any of these components may be embodied as information, data structures (e.g., searchable databases or knowledge bases), computer program logic or components, or a combination thereof. For example, some components may be embodied as rules, templates, data, arguments, parameters, and/or computer code. Some of these components may be domain-specific, while other components may be considered domain-independent or "generic."

As used herein, the term "domain" may refer to a category of information and/or activities in relation to which the VPA 112 may engage in a conversational natural language dialog with a computing device user. In some cases, "domain" may refer to the scope of a particular VPA application to which the VPA 112 is directed, or to a portion thereof. For example, a VPA application may be directed specifically to e-commerce shopping for "oil filters" (a single domain or concept) while another VPA application may be more broadly directed to "automotive supplies" (a broader category of items that may include oil filters, spark plugs, and other supplies. Still other VPA applications may be designed specifically for use in an automobile (e.g., as a driver's assistant), in connection with a financial services web site (e.g., as a banking assistant or "virtual teller"), to provide healthcare information or recommendations (e.g., as a doctor's assistant), or for any number of other specific or more generalized applications. Some examples of VPA components that may be included in the VPA model 136 are described in other patent applications of SRI International, such as, for example, Kalns, et al., U.S. patent application Ser. Nos. 13/891,864 and 13/891,864, filed May 10, 2013, entitled "Rapid Development of Virtual Personal Assistant Applications." However, this disclosure is not limited thereby, and any suitable VPA components may be included in the VPA model 136 and/or otherwise utilized by the VPA engine 122 in accordance with the requirements of a particular design.

Other embodiments of the VPA 112 may include additional components or modules. Further, some components described herein as being included in the VPA 112 or the VPA engine 122 may be located external to the VPA 112 or the VPA engine 122, as the case may be, in some embodiments, and thus communicate with the VPA 112 or the VPA engine 122, by a suitable communication link such as one of the types of communication links described herein.

In the illustrative embodiment, the VPA 170 is similar to the VPA 112 as described above. That is, the VPA 170 may include various computer-executable components similar to those of the VPA 112. For example, the VPA 170 includes a multi-modal interface 172, a VPA engine 174, a VPA-to-VPA communication interface 186, and a VPA model 188 as shown. Further, the VPA engine 174 includes a user intent interpreter 176, a reasoner 178 (which includes a VPA-to-VPA communication reasoner 180 and a cross-VPA dialog manager 182), and a multi-modal output generator 184. The description of those components of the VPA 112 is equally applicable to the description of the components of the VPA 170 and is not repeated herein for clarity of the description.

The network(s) 140 may be embodied as any number of various wired and/or wireless telecommunication networks. As such, the network 140 may include one or more networks, routers, switches, computers, and/or other intervening devices. For example, the network 140 may be embodied as or otherwise include one or more cellular networks, telephone networks, local or wide area networks, publicly available global networks (e.g., the Internet), short-range wireless communication links (e.g., BLUETOOTH or Near-Field Communication (NFC)), or any combination thereof. It should be appreciated that, in some embodiments, the computing system 100 or portions thereof may be embodied as a cloud computing environment.

As indicated above, the VPA 112 may communicate with the VPA network service 150 over the network 140 to determine an appropriate VPA (e.g., the VPA 170) with which to communicate regarding a dialog session or portion thereof. In some embodiments, a VPA (e.g., the VPA 112) may select more than one other VPA with which to communicate in order to accomplish the objective of a particular dialog session. Thus, references herein to "pairing" may refer to a communicative coupling of more than two VPAs, in some embodiments.

The illustrative VPA network service 150 includes, among other machine-executable (e.g., computer-executable) components, a VPA-to-VPA translator 152 (hereinafter "the translator 152"), a VPA monitor 154, and a VPA directory service 156 (which includes a domain model registry 158). The particular information communicated from the VPA 112 to the VPA network service 150 in order to determine the appropriate other VPA (e.g., the VPA 170) may vary depending on the particular embodiment. For example, the VPA 112 may transmit the intent, the user dialog, ambiguous dialog, and/or other information to the VPA network service 150, along with information identifying the sending VPA 112 and information identifying the receiving VPA (e.g., the VPA 170). As noted above, the VPA-identifying information may include an internet protocol (IP) address, a media access control (MAC) address, or some other identifier that identifies the VPA distinctly or uniquely from other VPAs.

In some cases, the VPA 112 may have already selected an appropriate recipient VPA (based, e.g., on aspects of the user's personal VPA network model 16) and thus sends a VPA-specific identifier identifying the selected VPA to the VPA network service 150. The translator 152 of the VPA network service 150 processes the incoming request for VPA access information from the VPA 112 into a format that may be used to query or otherwise communicate with the VPA directory service 156.

In some embodiments, the VPAs in the VPA network 110 may "register" their VPA models (e.g., the VPA models 136, 188) with the VPA network service 150, and such registration and related access information (e.g., API information) may be stored in the domain model registry 158. Thus, whereas in some embodiments, VPAs may transfer management of a user's dialog session at least temporarily to another VPA (e.g., the dialog handling is transitioned from one VPA engine 122 to another VPA engine 174), in other embodiments, a VPA may use the domain model registry 158 to identify a relevant VPA model (or a domain-specific portion thereof), and then simply access the relevant VPA model or portion thereof, while continuing to handle the dialog session itself using the other VPA's model.

The VPA network service 150 may access data and/or services of the VPA directory service 156 to identify or select the appropriate VPA (e.g., the VPA 170) to which the VPA 112 should pair. The VPA directory service 156 may include, for example, a system that stores, organizes, and provides access to information regarding each of the VPAs in the VPA network 110. For example, the VPA directory service 156 may include information relating to the physical/virtual address of the VPAs (e.g., an IP address or uniform resource identifier (URI)), API-related information (e.g., a format or mode in which to communicate with a particular VPA), communication and security protocols, privilege and access control information (e.g., the other VPAs with which the VPA 112 is permitted to communicate) and/or other VPA-related information.

Additionally, the VPA directory service 156 may include services to modify the data stored within the VPA directory service 156. For example, the VPA directory service 156 may include functionality for discovering new VPAs entering the VPA network 110, adding VPAs to the VPA network 110, updating information related to one or more VPAs (e.g., changing the physical address of a VPA), and/or removing VPAs from the VPA network 110. As shown, the illustrative VPA directory service 156 includes the domain model registry 158, which includes data that describes the domain of each of the VPAs within the VPA network 110 to the extent that those VPAs are domain-specific. Accordingly, the domain model registry 158 may be used to determine the area of expertise of each of the VPAs and, therefore, facilitate the selection of a VPA with which the VPA 112 should communicate to handle a particular dialog request. The translator 152 may translate the retrieved information (e.g., including secure pairing information for a relevant VPA) into a format for transmission back to the VPA 112 in a form that may be understood and/or executed by the VPA 112.

In some embodiments, the VPA network service 150 also includes a VPA monitor 154, which may be used to maintain the reliability of the VPA network 110. The VPA monitor 154 may execute a reliable VPA-to-VPA communication protocol to ensure that the user's NL dialog was reliably interpreted, reasoned, and/or otherwise handled by the receiving VPA, and that the sending VPA (e.g., the VPA 112) has received a dialog response from the receiving VPA (e.g., the VPA 170). In other embodiments, the functionality of the VPA monitor 154 may be provided by a network service more generally (e.g., by a TCP/IP network).

It should be appreciated that the reasoner 126 ordinarily has a "reason" to send the dialog request (e.g., inability to interpret dialog or generate an output intent) to another VPA. Accordingly, the VPA monitor 154 may be employed to monitor communications between the VPAs to verify that such reason has been satisfied. The VPA monitor 154 may implement such a VPA reliability protocol in various ways depending on the particular embodiment. For example, the VPA monitor 154 may snoop or otherwise monitor communications between the paired VPAs (e.g., the VPA 112 and VPA 170). Alternatively or in addition, the VPA monitor 154 may transmit query messages to the paired VPAs 110, 170 to determine, for example, the status of the inter-VPA communications. In yet another embodiment, communications between the paired VPAs (e.g., the VPA 112 and the VPA 170) may be relayed through the VPA network monitor 154. If the interpretation, reasoning, output, or answer provided by the receiving VPA (e.g., the VPA 170) is insufficient in some way (e.g., in the view of the VPA 112 or the VPA monitor 154), the VPA monitor 154 may provide the VPA 112 with pairing information for another VPA. In some cases, the VPA monitor 154 may also monitor the level of activity of the VPAs in the network 110, so that VPAs that are inactive for a period of time may be removed from the VPA directory service 156, or to generate statistics regarding the level of activity of the different VPAs in the network 110.

It should be appreciated that pairings of VPAs that may be effectuated with the assistance of the VPA network service 150 are intended to be secure in that the information transmitted from one VPA to another via a pairing is not readily accessible to other entities on the network 140, and the pairings themselves may only occur if both of the VPAs in the pair allow such a pairing, in accordance with applicable security policies or otherwise. The VPA-to-VPA communications may be encrypted, in some embodiments.

As shown in the illustrative embodiment, the VPA network service 150 and/or the VPAs 110, 170 may access the user-personal VPA network models 160, which generally include a user model 162 for each user of a VPA. The user-personal network models 160, 162 and/or portions thereof may be embodied as one or more searchable data structures, such as a database or knowledge base. Each user model 160 includes the cross-VPA dialog history 164, user-specific preferences 166, and permissions 168, including security and privilege information, authentication information, and other information relating to a particular user. The cross-VPA dialog history 164 may be updated by the VPAs 110, 170 or the VPA network service 150, to record information relating to the user's previous dialog sessions with each of the VPAs 110, 170, each time a communicative exchange occurs between a VPA and the user, or at the conclusion of a dialog session, for example. The cross-VPA dialog history 164 stores, for example, instances of communicative exchanges between the user and the various VPAs, input and output intent pairs, and/or other dialog-related information. Thus, the cross-VPA dialog history 164 can be used by VPAs to provide continuity and smooth transitioning of a dialog session from one VPA to another, or for other reasons.

The preferences 166 may indicate, for example, where the corresponding user likes to shop, based on the user's web site usage history, or other preferences that are explicitly stated by the user (e.g., as VPA configuration settings). As such, if the user indicates in a VPA dialog that he or she is interested in shopping for a particular item, the VPA may access or otherwise direct the user to a website for the user's preferred merchant based on the preferences 166. As shown in the illustrative embodiment, one or more of the user models 160 may not be open to the public (i.e., may be "locked"). That is, in some embodiments, the user models 160 may only be accessed by users and/or VPAs that have authorization to do so (e.g., users listed in the particular user model 160 or directory service 156). Further, those users or VPAs may need to execute an authentication protocol, operate using specified cryptographic procedures, and/or communicate over a secure communication channel. In some embodiments, one or more of the user-personal VPA network models 160 or portions thereof may be embodied similar to those disclosed in, for example, the following patent application of SRI International: Weiner, U.S. patent application Ser. No. 13/562,753, filed Jul. 31, 2012, entitled "Personalized Voice-Driven User Interfaces for Remote Multi-User Services."

The VPA network service 150 and/or the VPAs 110, 170 may also communicate with the other services 190 over the network 140. The other services 190 may include, for example, websites that do not have VPAs and other non-VPA network services. For example, as discussed above, the VPA 112 may direct a particular user to a merchant's traditional screen-based website or extract information from and communicate with the website in the background. That is, the user may actually be communicating with the merchant's traditional website but doing so fluidly through the user's VPA. In some embodiments, portions of the VPA network service 150 may be implemented as disclosed in, for example, Cheyer, U.S. Patent Application Publication No. 2003/0046201, filed Apr. 8, 2002, entitled "Method and System for Creating E-Marketplace Operations."

Figure 2:
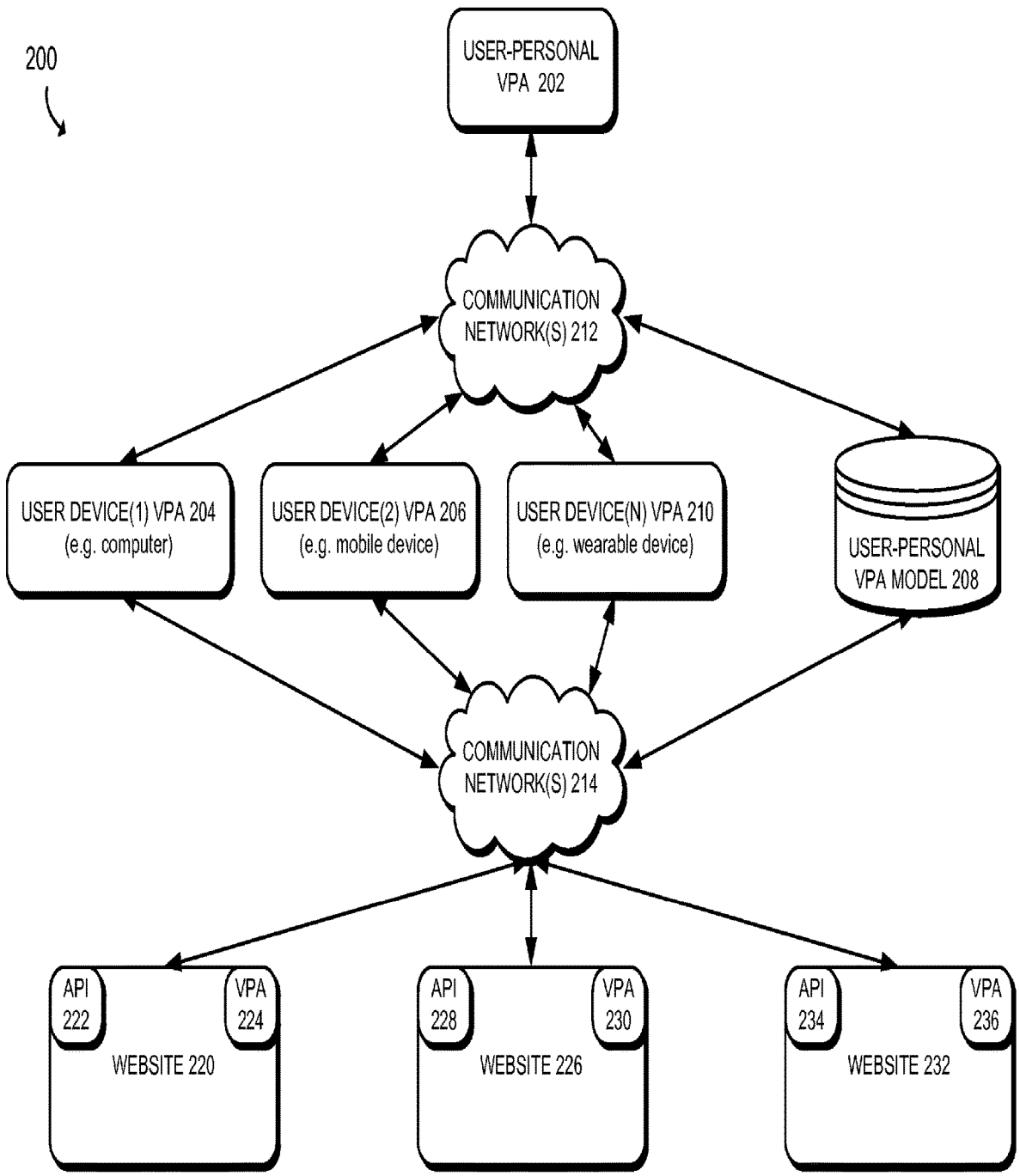
FIGS. 2-6 are a simplified block diagrams of various embodiments of VPA networks.

FIGS. 2-6 illustrate various embodiments of the VPA network 110 and potential uses of the computing system 100. Referring now to FIG. 2, an illustrative VPA network 200 includes a user-personal VPA 202, networks 212, 214, user device VPAs 204, 206, 210, a user-personal VPA model 208, and websites 220, 226, 232. As discussed above, VPAs may communicate with one another to interpret and generate an output based on the user's input and may also share information with one another. For example, the VPAs may share information so that if one of the VPAs (e.g., the VPA 202) is asked the same or a similar question (or presented with similar NL dialog) as another VPA (e.g., the VPA 204) has previously handled, the VPA receiving the new request (e.g., the VPA 202) may handle the dialog without having to consult with the other VPA (e.g., the VPA 204).

In the illustrative embodiment, the user-personal VPA 202 may receive and/or otherwise share information from each of the user device VPAs 204, 206, 208. As shown, the VPAs 204, 206, 208 may be embodied in different computing devices. For example, the user device VPA 204 may be embodied as a computer-based VPA, the user device VPA 206 as a mobile device-based VPA, and the user device VPA 210 as a wearable device-based VPA. When the user communicates with the user device VPA 204, 206, 210, any learned information or portions of the dialog itself may be shared with the user-personal VPA 202 over the network 212. As such, the user-personal VPA 202 may be viewed as a "global" user-personal VPA having an understanding of the user's preferences, statistics, habits, language style, and other characteristics across the various device-specific VPAs 204, 206, 210. For example, the VPA 202 has access to more information regarding the user's dialog history, websites accessed, and other information than any of the device-specific VPAs 204, 206, 210, alone. It should be appreciated that in some embodiments, the VPA 202 may have a larger memory than the device-based VPAs 204, 206, 210, because the device-based VPAs 204, 206, 210 may have limited memory space due to the form factor of those devices. In some embodiments, the VPA 202 or portions thereof (or any of the VPAs disclosed herein, for that matter) may be hosted or otherwise located "in the cloud," e.g., on one or more servers networked in a cloud computing environment. In other embodiments, the VPA 202 or portions thereof may reside on a local computing device.

Accordingly, each of the VPAs 204, 206, 210 may communicate dialog requests to the user-personal VPA 202 (e.g., via the VPA network service 150) for further clarification or for other reasons. For example, the user may state, at the VPA 206, "I went to dinner last week at an excellent restaurant. I would like to go there again. Please book a reservation for four." If the user's current dialog request is made on a different device than the user's previous dialog request, the currently used device may not have any information regarding the restaurant visited last week. Accordingly, the currently used device VPA 206 may send the dialog request to the VPA 202 or otherwise communicate with the VPA 202 (which does have that information) to interpret and respond to the current dialog request.

Each of the user device VPAs 204, 206, 210 may communicate with one or more websites 220, 226, 232 over the network 214. In the illustrative embodiment, each of the websites 220, 226, 232 includes a web-based VPA 224, 230, 236 an application programming interface (API) 222, 228, 234. As such, the user device VPAs 204, 206, 210 may engage in VPA-to-VPA communication with a web-based VPA 224, 230, 236 of one or more of the websites 220, 226, 232 using the VPA-to-VPA communication interfaces 134 of the VPAs 204, 206, 210, 224, 230, 236 described above. In some embodiments, the VPA network service 150 may be utilized to determine pairing information for the web-based VPAs 224, 230, 236. However, in other embodiments, the pairing information may be provided by the corresponding website 220, 226, 232. The APIs 222, 228, 234 permit the VPAs 204, 206, 210 to communicate with the web-based VPAs 224, 230, 236 and/or to access other resources or services of the websites 220, 226, 232.

Although not shown in the illustrative embodiment, the user-personal VPA 202 may communicate directly with one or more of the websites 220, 226, 232 in some embodiments. As discussed above, the user-personal VPA model 208 includes preferences, security and privilege information, authentication information, and other information relating to the user and his or her usage of the various VPAs on the network 200. Further, although the networks 212, 214 are illustratively shown as separate networks, it should be appreciated that in some embodiments the components of the VPA network 200 may communicate with one another over a single network 212. Additionally, in some embodiments, the VPA network 200 may be implemented in a cloud computing environment.

Figure 3:
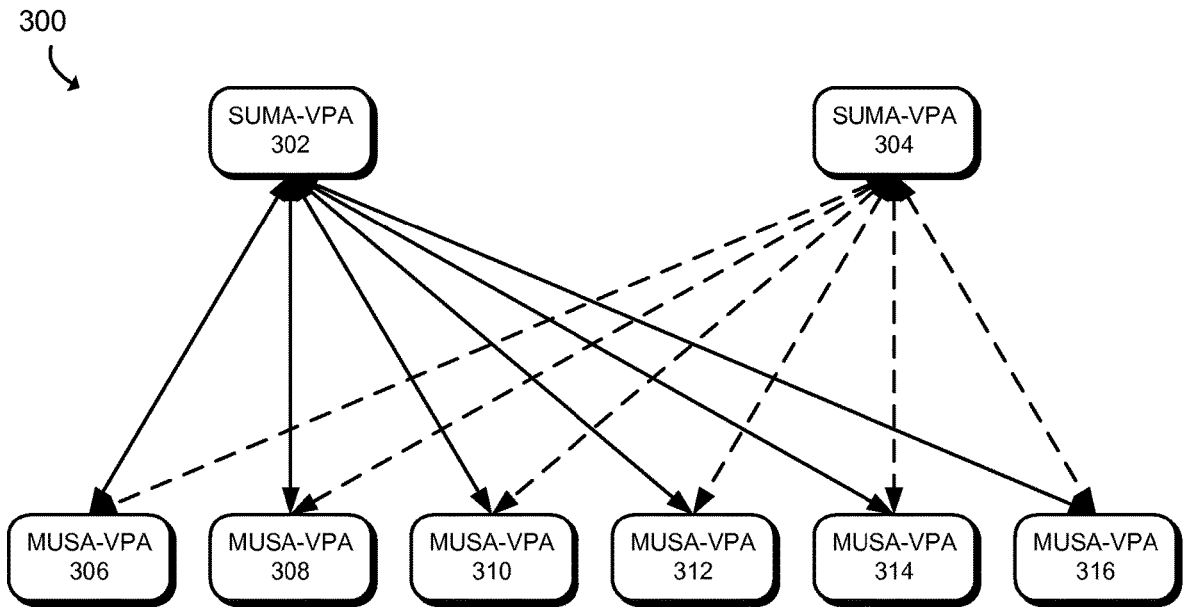

Referring now to FIG. 3, an illustrative VPA network 300 includes a plurality of VPAs as shown. In some cases, a VPA may be characterized as being either a single user, multiple application VPA (SOMA-VPA) or a multiple user, single application VPA (MUSA-VPA). For example, the user-personal VPA 202 of FIG. 2 is an example of a SUMA-VPA, because it is based on VPA dialog with a single user, although that user may communicate (e.g., via VPA-to-VPA communication) with many applications using the VPA. Further, the web-based VPA 224 of FIG. 2 is an example of a MUSA-VPA, because it is directed to a single application (i.e., the website 220) but designed to communicate with many users.

As discussed above, VPAs may communicate with one another to handle user-supplied natural language dialog input and share information. For example, as shown in the illustrative embodiment, the VPA network 300 includes a set of VPAs including two SUMA-VPAs 302, 304 and six MUSA-VPAs 306, 308, 310, 312, 314, 316. In one embodiment, the SUMA-VPAs 302, 304 are personal VPAs for particular users and the MUSA-VPAs 306, 308, 310, 312, 314, 316 are VPAs associated with particular merchants. As discussed above and illustrated in FIG. 3, each of the SUMA-VPAs 302, 304 may communicate with any one of the MUSA-VPAs 306, 308, 310, 312, 314, 316. In other embodiments, each of the SUMA-VPAs 302, 304 may also communicate with one another, and each of the MUSA-VPAs 306, 308, 310, 312, 314, 316 may also communicate with one another. In order for all of the information to be shared among the VPAs in the VPA network 300, each SUMA-VPA communicates with each MUSA-VPA, in the illustrative embodiment.

Figure 4:
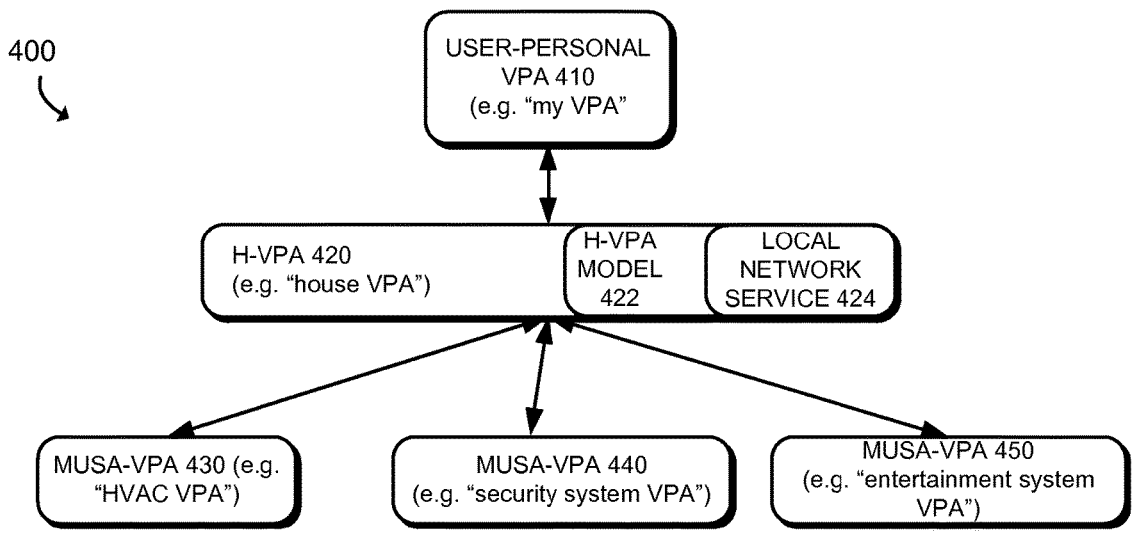

Referring now to FIG. 4, an illustrative VPA network 400 includes a user-personal VPA 410 (i.e., a SUMA-VPA), a plurality of MUSA-VPAs 430, 440, 450, and a hierarchical VPA 420 (H-VPA) communicatively coupled between the user-personal VPA 410 and the MUSA-VPAs 430, 440, 450. Similar to the user-personal VPA 202 of FIG. 2, which acts as a global VPA for the device-based VPAs, an H-VPA may be used to aggregate, correlate, or otherwise share information with one or more VPAs (e.g., via VPA-to-VPA communication) based on a common or similar characteristic of the VPAs (e.g., a category of objects or persons) organized under the H-VPA 420. In the illustrative embodiment, the H-VPA 420 acts as the "global" VPA for the three MUSA-VPAs 430, 440, 450 shown. For example, the MUSA-VPA 430 may be embodied as an HVAC VPA, the MUSA-VPA 440 as a security system VPA, and the MUSA-VPA 450 as an entertainment system VPA. In some embodiments, the user may interact with any of the MUSA-VPAs 430, 440, 450 directly or indirectly through the user-personal VPA 410. Each of the MUSA-VPAs 430, 440, 450 may be directed to its specific domain. Accordingly, the MUSA-VPAs 430, 440, 450 may communicate with the H-VPA 420 via VPA-to-VPA communication to, for example, continue a dialog, clarify any unclear user dialog input, and/or share information with the H-VPA 420 so that the H-VPA 420 may maintain a more global understanding of user dialog with the MUSA-VPAs. In other embodiments, the user may communicate directly with the MUSA-VPAs via the user-personal VPA 410. Thus, the H-VPA 420 has an H-VPA model 422 that is similar to the VPA models 136, 188, but which allows the H-VPA 420 to understand and translate domain-specific dialog of the lower-level MUSA-VPAs 430, 440, 450, and, in some cases, re-interpret that dialog so that it may be communicated "upward" to the user-personal VPA 410 and/or other "higher-level" VPAs in the network. In some embodiments, the H-VPA model 422 may include a number of different "sub" models, each of which allows the H-VPA 420 to communicate with a different VPA or different type of VPA (e.g., VPAs at different levels in the hierarchical network).

As shown, the H-VPA 420 includes an H-VPA model 422 and a local network service 424. Similar to the VPA model 136, the H-VPA model 422 may include generic or domain-specific components, rules, grammars, intents, task flows, and/or responses. The local network service 424 is analogous to the VPA network service 150 but possibly on a smaller scale (e.g., for a small local network). As such, the local network service 424 may perform one or more functions described above in reference to the VPA network service 150. For example, the local network service 424 may include a directory that identifies all of the VPAs in the VPA network 400 or a subset thereof (e.g., all MUSA-VPAs in the network 400). Additionally, the local network service 424 may store information regarding appropriate security permissions, communication protocols, and/or acceptable formats for each of those VPAs. Further, in some embodiments, various VPAs in the VPA network 400 may be associated with plug-and-play devices. Accordingly, the local network service 424 may monitor the network 400 to maintain an updated accounting of VPAs currently connected to the network 400.

In some embodiments, the user may communicate with the user-personal VPA 410, which in turn may communicate with the H-VPA 420 to coordinate the performance of actions in low-level task flows. For example, the user may indicate to the VPA 410 that he or she is going on vacation, which is transmitted to, snooped by, or otherwise shared with the H-VPA 420. Based on that information, the H-VPA 420 may interpret the dialog and communicate portions of the dialog to the MUSA-VPAs 430, 440, 450 to perform task flows consistent with the user being on vacation. For example, the H-VPA 420 may communicate a portion of the user's dialog to the MUSA-VPA 430 that the MUSA-VPA can interpret to modify the HVAC system to prefer energy conservation to comfort, and the H-VPA 420 may communicate a portion of the user's dialog to the MUSA-VPA 440 that the MUSA-VPA 440 may interpret to modify the security system to heightened security throughout the duration of the vacation, and the H-VPA 420 may communicate a portion of the user's dialog to the MUSA-VPA 450 that the MUSA-VPA 450 may interpret to turn off all entertainment systems. Accordingly, the hierarchical structure and VPA-to-VPA communication permits the user to communicate higher-level dialog (e.g., "global ideas") to his or her personal VPA 410 yet have task flows performed across multiple lower-level VPAs in accordance with that dialog.

Figure 5:
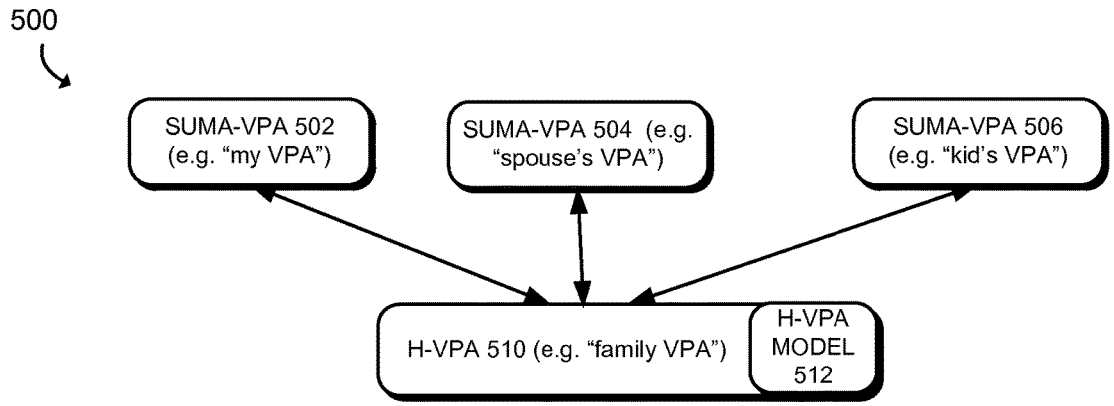

Referring now to FIG. 5, the illustrative VPA network 500 includes an H-VPA 510 communicatively coupled to a plurality of SUMA-VPAs 502, 504, 506. The H-VPA 510 acts as the "global" VPA for the three illustrated SUMA-VPAs 502, 504, 506. As discussed above, the H-VPA 510 includes an H-VPA model 512 and, although not shown, may also include a local network service similar to the local network service 424 described above with reference to FIG. 4. In the illustrative embodiment, the SUMA-VPA 502 is embodied as a user's personal VPA (i.e., "my VPA"), the SUMA-VPA 504 as the user's spouse's personal VPA 504, the SOMA-VPA 506 as the user's kid's personal VPA, and the H-VPA 510 as a family VPA. As discussed above, each of the SUMA-VPAs 502, 504, 506 may communicate with the H-VPA 510 to continue a dialog, share information and/or request clarification of a user dialog. In such a way, the H-VPA 510 is able to maintain a more global understanding of user dialog conducted by the individual SUMA-VPAs. It should be appreciated, however, that some of the information relating to one of the SUMA-VPAs may be kept secret from the other SUMA-VPAs in the VPA network 500. For example, the parents' VPAs 502, 504 may have access to certain information that the kid's VPA 506 cannot access.

As with the H-VPAs described above, the more "global" understanding of the H-VPA 510 and the ability to engage in VPA-to-VPA communication improves the ability of each SUMA-VPA 502, 504, 506 to understand user dialog. For example, suppose the child had engaged in a conversation with one of the parents (e.g., the spouse) regarding a restaurant at which the spouse ate last week (and scheduled a reservation through her personal VPA 504) but that the conversation between the spouse and child was performed offline (i.e., not using VPAs). Further, suppose the child requests of his or her personal VPA 506, "I forgot the name, but take me to the restaurant Mom ate at last week." Typically, the child's personal VPA 506 would be unable to reliably interpret this request. However, in the illustrative embodiment, the child's personal VPA 506 may communicate with the H-VPA 512, which has the more "global" understanding of the family dialog, etc., to clarify the child's dialog and "fill in the gaps" so-to-speak.

As another example, the VPAs 502, 504, 506 may be MUSA-VPAs rather than SUMA-VPAs. For instance, in a business or military environment, the H-VPA 510 may be a VPA that is used by a supervisor or commander, while the MUSA-VPAs may be VPAs that are used by workers or soldiers out in the field. Each MUSA-VPA's dialog capabilities may be limited to the particular tasks or areas of expertise of the workers or soldiers in the field, while the VPA 510 may have a broader understanding of dialog relating to all of the topics covered by the MUSA-VPAs, as well as other topics.

One example of an application of such a network 500 may be in the case of a supervisor that needs to schedule a meeting with all of his or her reports. The supervisor may tell his or her VPA 510 that, "I need to schedule a meeting next Tuesday with the business group." The VPA 510 may understand, from the supervisor's dialog history, that the "business group" means the workers that use the VPAs 502, 504, 506. Accordingly, the VPA 510 may send all or portions of the supervisor's dialog request (and/or input intent) to the VPAs 502, 504, 506. The VPAs 502, 504, 506 may in turn interpret the dialog request, check the calendar of their respective user, engage in dialog with their respective user (e.g., "are you available on Tuesday for a meeting with Joe?"), and communicate the user's dialog response along with calendar information back to the VPA 510. The VPA 510 may then correlate all of the information received from all of the VPAs 502, 504, 506, determine the meeting details, and send calendar notifications to the users of all of the VPAs 502, 504, 506, 510. In this way, the network 500 can reduce the amount of back-and-forth required to accomplish administrative tasks and other objectives that involve the coordination of disparate information held by different users' VPAs.

Figure 6:
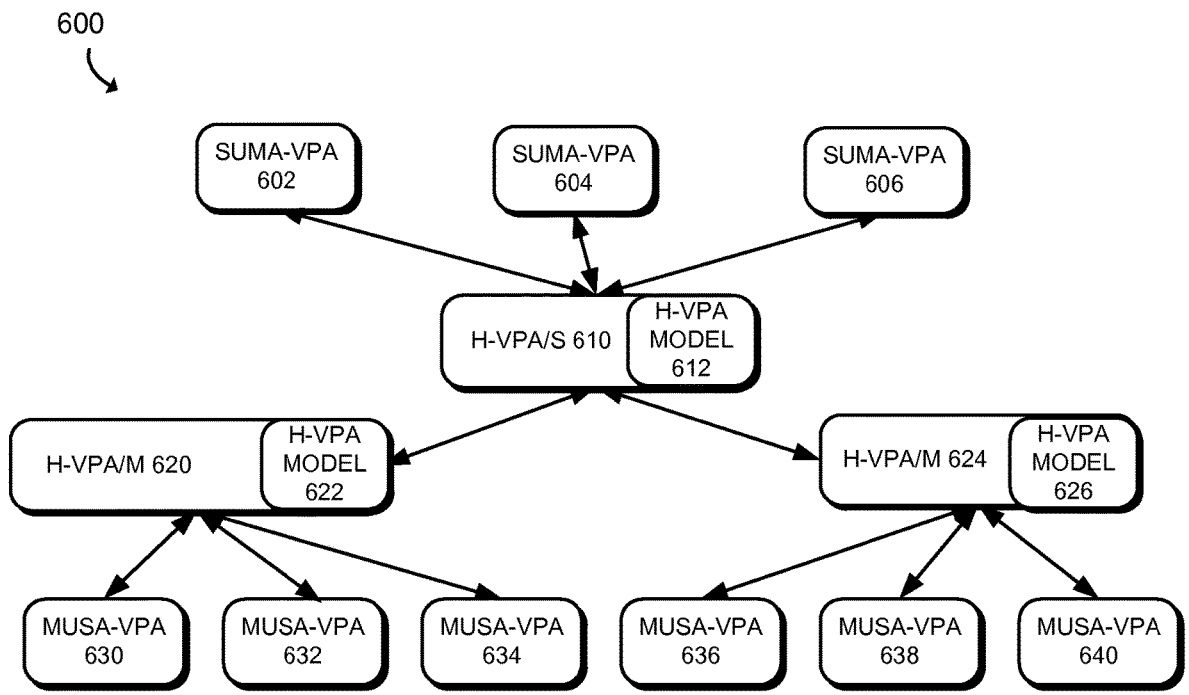

Referring now to FIG. 6, an illustrative VPA network 600 includes a plurality of SUMA-VPAs 602, 604, 606, H-VPAs 610, 620, 624, and MUSA-VPAs 630, 632, 634, 636, 638, 640. Each of the H-VPAs 610, 620, 624 includes an H-VPA model 612, 622, 626 as described above and, although not shown, may also include a local network service similar to the local network service 424 described above in reference to FIG. 4. As shown, the H-VPA 620 acts as an H-VPA having a more "global" understanding of the group of VPAs including the MUSA-VPAs 630, 632, 634. Additionally, the H-VPA 624 acts as an H-VPA having a more "global" understanding of the group of VPAs including the MUSA-VPAs 636, 638, 640. Further, the H-VPA 610 acts as an H-VPA having a more "global" understanding of the group of VPAs including the SUMA-VPAs 602, 604, 606. As discussed above, the H-VPAs serve to coordinate dialog flows, improve dialog understanding and/or to coordinate event/task handling across numerous VPAs. For example, several SUMA-VPAs may communicate with a single "global" H-VPA and several MUSA-VPAs may communicate with a single "global" H-VPA.

Figure 7:
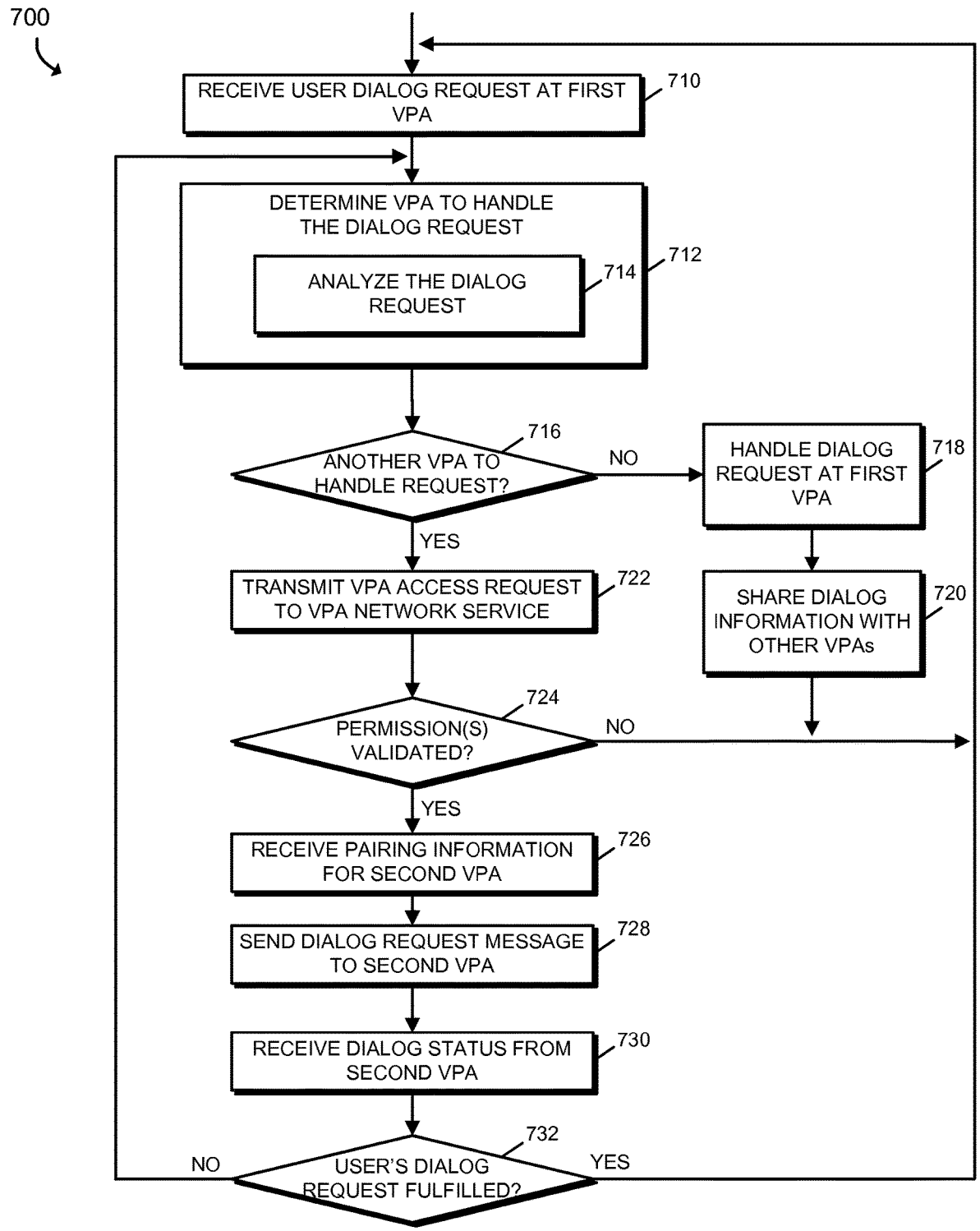
FIG. 7 is a simplified flow diagram of at least one embodiment of a method for a VPA to communicate with another VPA to handle a dialog request, as disclosed herein.

Additionally, in the illustrative embodiment, the H-VPAs themselves may communicate with one another to conduct dialog, share information and/or clarify user dialog. It should be appreciated that the use of H-VPAs in very large VPA networks may significantly reduce the number of communication connections necessary to share information among the VPAs. For example, in the relatively small VPA network 600 of FIG. 6, the SUMA-VPA 602 need only communicate with the H-VPA 610. Although the H-VPA 610 may communicate with other H-VPAs 620, 624, the number of communications is significantly reduced compared to that of FIG. 3 in which each SUMA-VPA communicates with each MUSA-VPA directly. In one embodiment, the H-VPA 610 may be embodied as the user-personal VPA 202 of FIG. 2 and configured to communicate with the H-VPAs 620, 624 to facilitate dialog understanding and task flow performance Referring now to FIG. 7, an illustrative method 700 for sending a dialog request from a first VPA (e.g., the VPA 112) to a second VPA (e.g., the VPA 170) is shown. The method 700 may be embodied as computerized programs, routines, logic and/or instructions executed by the computing system 100, for example by the VPA 112. At block 710, the first VPA receives a user dialog request (e.g., NL dialog input from the user). At block 712, the first VPA determines the appropriate VPA to handle the request. In doing so, the first VPA may analyze the dialog request at block 714. As discussed above, in some embodiments, the VPA analyzes, synthesizes, and otherwise attempts to generate a suitable output intent based on the input intent of the user's NL dialog. If the VPA is unable to adequately or completely generate an output intent, the communication reasoner 128 may determine that the NL dialog, intent information, and/or other information should be sent to another VPA (e.g., having a different domain or scope) for clarification. It should be appreciated that the first VPA may determine that another VPA should handle the request at any point in the interpretation or analysis of the user's dialog.

At block 716, the first VPA determines whether another VPA should handle the request. If the first VPA will continue to handle the dialog request, at block 718, the dialog request is handled at the first VPA as normally would occur in the execution of a VPA. At block 720, the first VPA may share dialog information or other information associated with the user's dialog, the intents, or the output with other VPAs. For example, as discussed above, the dialog history and other dialog information may be shared with the VPA network service 150, or used to update the cross-VPA dialog history 164, or communicated to a more "global" VPA.

Further, at block 716, if the first VPA determines that another VPA should handle the dialog request, in some embodiments, the first VPA selects a VPA to handle the dialog request. To do this, the first VPA may use any suitable criteria including the content of the user's dialog, the user's preferences, dialog history, and/or user-specific permission information. In other embodiments, the network service 150 rather than the first VPA may identify an appropriate VPA with which the first VPA should communicate in a particular circumstance, based on the permission information that the network service 150 has available to it and/or other criteria. Thus, the first VPA transmits a VPA access request to the VPA network service 150, which may or may not specify a selected VPA, at block 722. As discussed above, the information transmitted to the VPA network service 150 may include, for example, the intents, the dialog, ambiguous portions of the dialog, and/or other information depending on the circumstances and the particular embodiment.

At block 724, the VPA network service 150 validates any permissions or privileges of the user and/or the first VPA vis a vis the selected VPA. For example, the user model 160 and the VPA directory service 156 may indicate the VPAs that the user, the first VPA, and the selected VPA are permitted to access. If the permissions are not validated (i.e., the first VPA and/or user are not permitted to access any relevant VPAs), the method 700 returns to block 710 at which the first VPA waits to receive the next user dialog request. In some embodiments, if the permissions are not validated, the first VPA may issue a clarification question to the user requesting user feedback or clarification of the previous dialog.

If the permissions are validated and the user and first VPA are permitted to access the selected VPA (and vice versa), then at block 726, the first VPA receives pairing information for a second VPA (e.g., the selected VPA) from the VPA network service 150. The pairing information may include, for example, a physical address of the second VPA and a communication format and protocol for communication between the first VPA and the second VPA. For example, the pairing information may indicate how the first VPA should structure the dialog request when sending it to the second VPA. At block 728, the first VPA formulates the VPA to VPA communication and sends the dialog request message to the second VPA.

At block 730, the first VPA may receive a dialog status message or clarification information from the second VPA. As discussed above, in some embodiments, the second VPA will handle the dialog request and communicate with the user itself. In such a case, the second VPA may send a status update to the first VPA indicating that the second VPA has responded to the user and the dialog session has concluded. The first VPA may also receive a dialog history including any subsequent dialog between the user and the second VPA and/or information obtained or used to clarify or otherwise respond to the dialog request. In other embodiments, the second VPA may transmit a message back to the first VPA indicating how the first VPA should respond to the user. Additionally, in some embodiments, the second VPA may periodically send status messages to the first VPA indicating whether the second VPA has yet resolved the dialog request.

At block 732, the first VPA determines whether the user's dialog request has been fulfilled (either by the first VPA or by the second VPA). If so, the method 700 returns to block 710 at which the first VPA waits to receive the next user dialog request. If the first VPA determines that the user's dialog request is not yet fulfilled, however, the method 700 returns to block 712 at which the first VPA determines another VPA to handle the request. That is, if the second VPA is unable to conduct or clarify the dialog or is only able to partially clarify or complete the dialog, the first VPA may determine whether it can now generate a suitable output. If not, the first VPA may request the VPA network service 150 to send pairing information for another suitable VPA.

Figure 8:
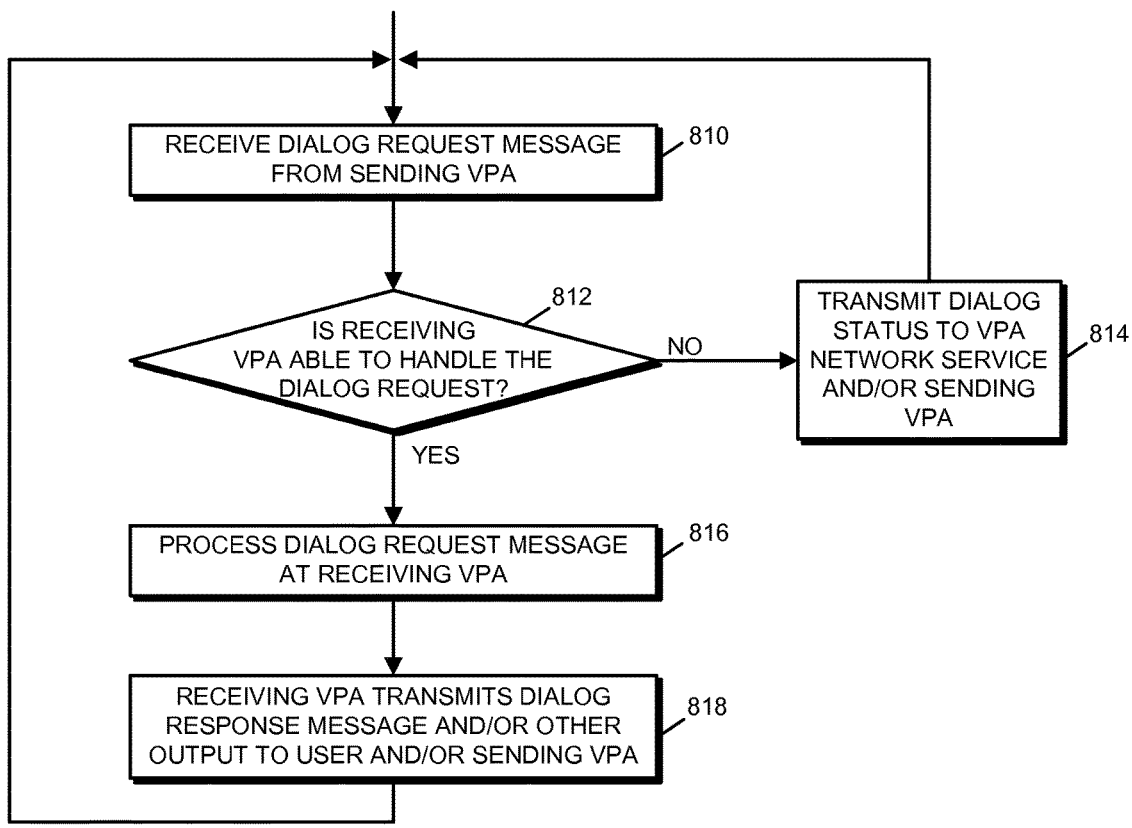
FIG. 8 is a simplified flow diagram of at least one embodiment of a method for a VPA to receive a dialog request from another VPA and handle the dialog request, as disclosed herein.

Referring now to FIG. 8, an illustrative method 800 for receiving a dialog request with a receiving VPA (e.g., the VPA 170) from a sending VPA (e.g., the VPA 112) is shown. The method 800 may be embodied as computerized programs, routines, logic and/or instructions executed by the computing system 100, for example by the VPA 170. At block 810, the receiving VPA receives a dialog request message from the sending VPA. At block 812, the receiving VPA determines whether it is able to handle the dialog request. That is, the receiving VPA determines whether it is able to continue the dialog or clarify the user's dialog in view of the analysis prepared by the sending VPA. For example, the sending VPA may have been able to understand all but an ambiguous portion of the dialog request. In such a case, the receiving VPA determines whether it is able to clarify that ambiguous portion of the dialog.

If the receiving VPA is able to handle the dialog request, the receiving VPA processes the dialog request message to generate a suitable output at block 816. For example, the receiving VPA may perform interpretation, reasoning, and/or other analytical procedures as discussed herein. At block 818, the receiving VPA transmits the generated output to the user and/or to the sending VPA. Further at block 812, if the receiving VPA determines that it is unable to handle the dialog request, the receiving VPA may, at block 814, transmit a dialog status message to the VPA network service 150 and/or the sending VPA indicating that it is unable to conduct or continue the dialog, or clarify the dialog input associated with the dialog request message. In such a case, the VPA network service 150 may transmit pairing information to the sending VPA identifying an alternative VPA as discussed above.

Figure 9:
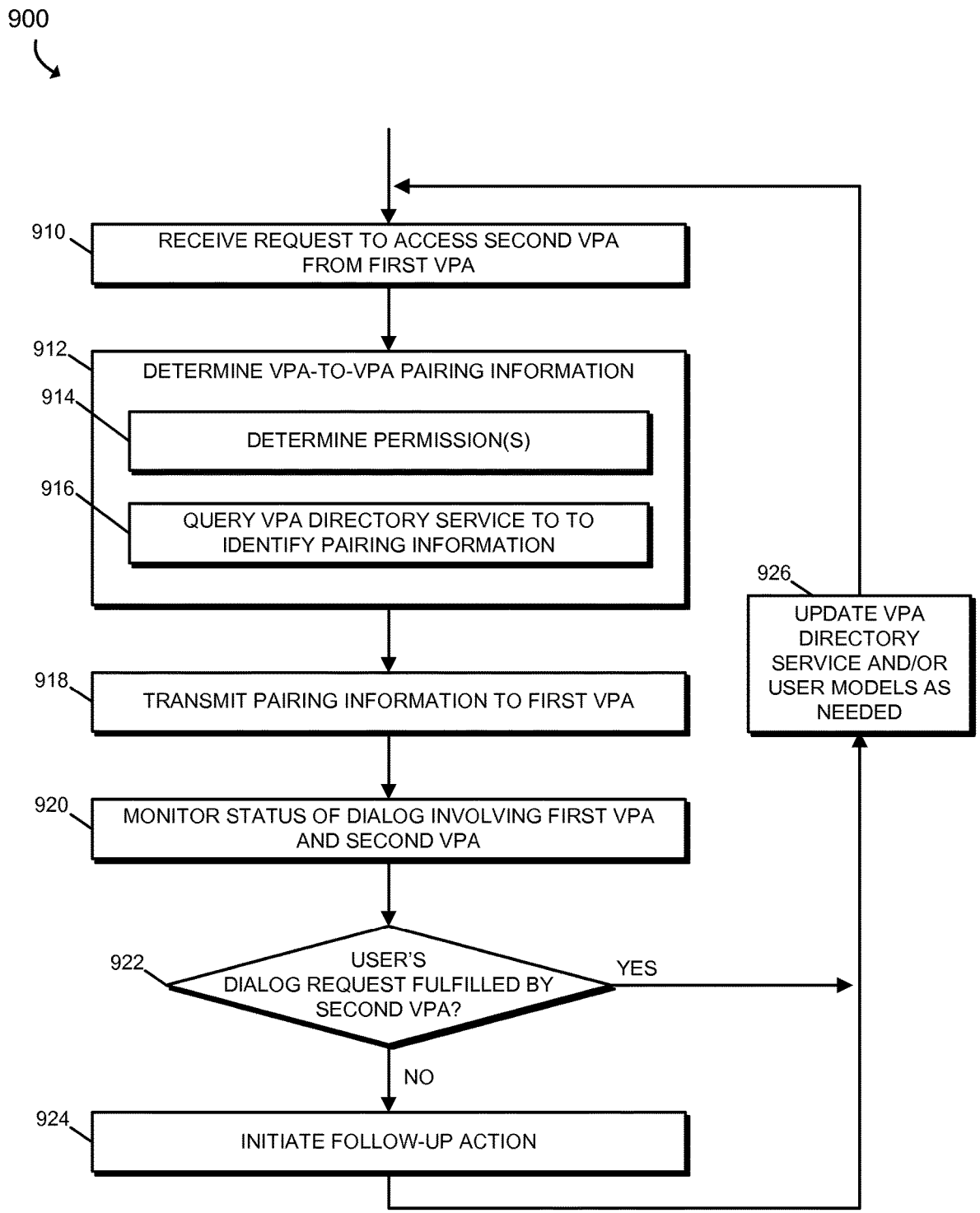
FIG. 9 is a simplified flow diagram of at least one embodiment of a method for enabling communication between two VPAs as disclosed herein.

Referring now to FIG. 9, an illustrative method 900 for facilitating communication between two VPAs with a VPA network service 150 is shown. The method 900 may be embodied as computerized programs, routines, logic and/or instructions executed by the computing system 100, for example by the VPA network service 150. At block 910, the VPA network service 150 receives a request from a first VPA to access a second VPA. In some embodiments, the request is directed to accessing a particular VPA. However, in other embodiments, the request is directed to accessing any VPA within the VPA network in which the first VPA may access (i.e., has necessary security permissions) and that will continue the dialog or further clarify the dialog request (e.g., ambiguous dialog) as discussed above.

At block 912, the VPA network service 150 determines pairing information for the second VPA. In doing so, the VPA network service 150 may determine the relevant permissions of the user and/or the first VPA at block 914. That is, the VPA network service 150 may determine which of the VPAs with which the user and first VPA may communicate. Additionally, at block 916, the VPA network service 150 may query the VPA directory service 156 to identify pairing information for a relevant second VPA. The domain model registry 158 of the VPA directory service 156 may indicate the domain and/or scope of the particular VPAs in the VPA network. The VPA network service 150 may utilize that information and other relevant information to identify an appropriate VPA with which the first VPA should communicate via VPA-to-VPA communication. At block 918, the VPA network service 150 transmits pairing information to the first VPA associated with the identified second VPA. All or portions of the directory service 156 may be embodied as a searchable data structure, such as a database.

At block 920, the VPA network service 150 monitors the status of the dialog between the first VPA and the second VPA. In some embodiments, block 920 may be omitted. For example, such monitoring services may be performed by one or more other entities on the network. As discussed above, in some embodiments, the VPA network service 150 snoops on the communication connection between the first VPA and the second VPA. In other embodiments, the VPA network service 150 may utilize a status query and response protocol to communicate with one or more of the first VPA and the second VPA to determine the status of their communication. That is, the VPA network service 150 determines whether the second VPA has reliably answered the dialog request posed by the first VPA. At block 922, the VPA network service 150 determines whether the user's dialog request has been fulfilled by the second VPA (i.e., whether the second VPA satisfactorily responded to the user itself or provided sufficient information to the first VPA to satisfactorily respond to the user). If so, the method 900 returns to block 910 in which the VPA network service 150 waits to receive another dialog request from the first VPA. If not, however, the VPA network service 150 initiates follow-up action at block 924. For example, the VPA network service 150 may transmit pairing information for another suitable VPA to the first VPA. The method 900 may proceed to block 926 from either block 922 or block 924. At block 926, the VPA network service 150 may update the VPA directory service 156 and/or one/or more of the user models 160, as needed. For example, the user-personal model 162 may be updated to reflect the most recent dialog history and/or user preference information, while the VPA directory service 156 may be updated to reflect the latest VPA accesses.

IMPLEMENTATION EXAMPLES

Figure 10:
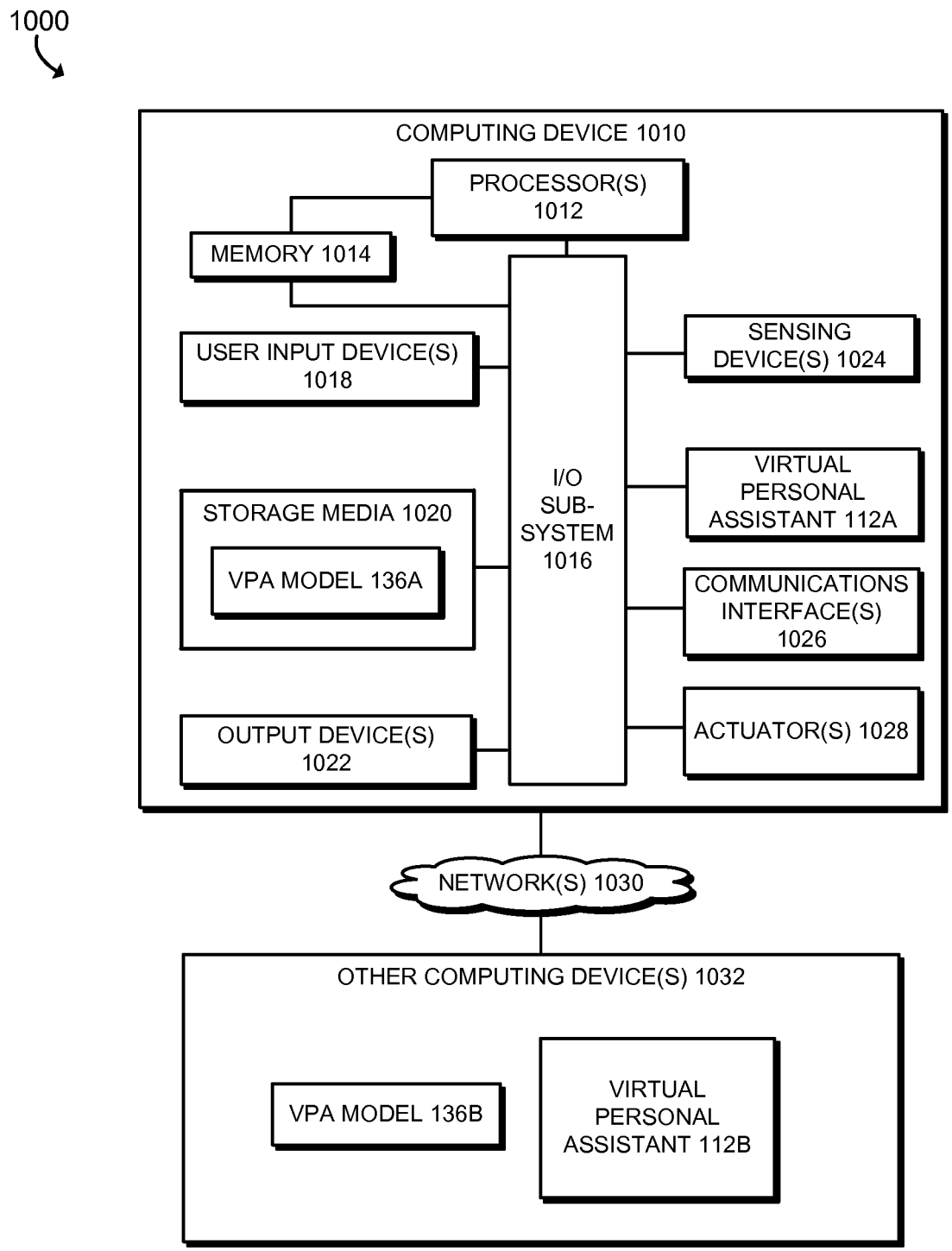
FIG. 10 is a simplified block diagram of at least one embodiment of a hardware environment for a platform including the VPA of the computing system of FIG. 1.

Referring now to FIG. 10, a simplified block diagram of an exemplary hardware environment 1000 for the computing system 100, in which the VPA 112 may be embodied, is shown. The illustrative environment 1000 includes a computing device 1010, which may be in communication with one or more other computing devices 1032 via one or more networks 1030. Illustratively, a portion 110A of the VPA 112 is local to the computing device 1010, while another portion 110B is distributed across one or more of the other computing systems or devices 1032 that are connected to the network(s) 1030.

In some embodiments, portions of the VPA 112 may be stored locally while other portions thereof are distributed across a network (and likewise for other components of the VPA 112). In some embodiments, however, the VPA 112 may be located entirely on the computing device 1010. In some embodiments, portions of the VPA 112 may be incorporated into other systems or interactive software applications. Such applications or systems may include, for example, operating systems, middleware or framework (e.g., application programming interface or API) software, and/or user-level applications software (e.g., another interactive software application, such as a search engine, web browser or web site application, or a user interface for a computing device).

The illustrative computing device 1010 includes at least one processor 1012 (e.g. a controller, microprocessor, microcontroller, digital signal processor, etc.), memory 1014, and an input/output (I/O) subsystem 1016. The computing device 1010 may be embodied as any type of computing device such as a personal computer or mobile device (e.g., desktop, laptop, tablet, smart phone, body-mounted device, etc.), a server, an enterprise computer system, a network of computers, a combination of computers and other electronic devices, or other electronic devices. Although not specifically shown, it should be understood that the I/O subsystem 1016 typically includes, among other things, an I/O controller, a memory controller, and one or more I/O ports. The processor 1012 and the I/O subsystem 1016 are communicatively coupled to the memory 1014. The memory 1014 may be embodied as any type of suitable computer memory device (e.g., volatile memory such as various forms of random access memory).

The I/O subsystem 1016 is communicatively coupled to a number of components including one or more user input devices 1018 (e.g., a microphone, a touchscreen, keyboard, virtual keypad, etc.), one or more storage media 1020, one or more output devices 1022 (e.g., audio speakers, displays, LEDs, projectors, etc.), one or more sensing devices 1024 (e.g., cameras, motion sensors, pressure sensors, kinetic sensors, temperature sensors, biometric sensors, and/or others), one or more communications interfaces 1026, and one or more actuators 1028, as well as the VPA 112A. The storage media 1020 may include one or more hard drives or other suitable persistent data storage devices (e.g., flash memory, memory cards, memory sticks, and/or others). Illustratively, portions of the VPA model 136A reside in the storage media 1020, while other portions of the VPA model 136B reside in storage media of one or more other computing devices 1032. In other embodiments, one or more of these components may reside entirely on the computing device 1010 or on another computing device 1032.

In some embodiments, portions of systems software (e.g., an operating system, etc.), framework/middleware (e.g., APIs, object libraries, etc.), and/or the VPA 112 reside at least temporarily in the storage media 1020. Portions of systems software, framework/middleware, the VPA 112 (including the VPA model 136) may be copied to the memory 1014 during operation of the computing device 1010, for faster processing or other reasons.

The communications interfaces 1026 may communicatively couple the computing device 1010 to one or more local area networks, wide area networks, personal clouds, enterprise clouds, public clouds, and/or to the Internet, for example. Accordingly, the communications interfaces 1026 may include one or more wired or wireless network interface software, hardware or firmware, for example, as may be needed pursuant to the specifications and/or design of the particular computing system 100. Additionally, the communications interfaces 1026 include a VPA-to-VPA communication interface for facilitating communication between the VPA 112 and other VPAs. Each of the other computing device(s) 1032 may be embodied as any suitable type of computing system or device such as any of the aforementioned types of devices or other electronic devices or systems. For example, in some embodiments, the other computing devices 1032 may include one or more server computers used to store portions of the VPA model 136. The computing system 100 may include other components, sub-components, and devices not illustrated in FIG. 10 for clarity of the description. In general, the components of the computing system 100 are communicatively coupled as shown in FIG. 10 by electronic signal paths, which may be embodied as any type of wired or wireless signal paths capable of facilitating communication between the respective devices and components.

The actuator(s) 1028 may include electrical, electromechanical, and/or other components, for example, that may be in communication with the VPA 112 and/or the VPA network service 150 to effectuate a response to VPA/user dialog. For example, in a vehicle-based VPA, the actuator(s) 1028 may include components such as temperature controls, media/infotainment controls, etc., that may be driven by a microcontroller or microprocessor-based subsystem that interfaces with the VPA 112 and/or the VPA network service 150, to enable control of such components in response to dialog with the VPA user. Similarly, in a home-based VPA, the actuator(s) 1028 may include, for example, smart meters for temperature control, door locking/unlocking mechanisms, and/or others.

Figure 11:
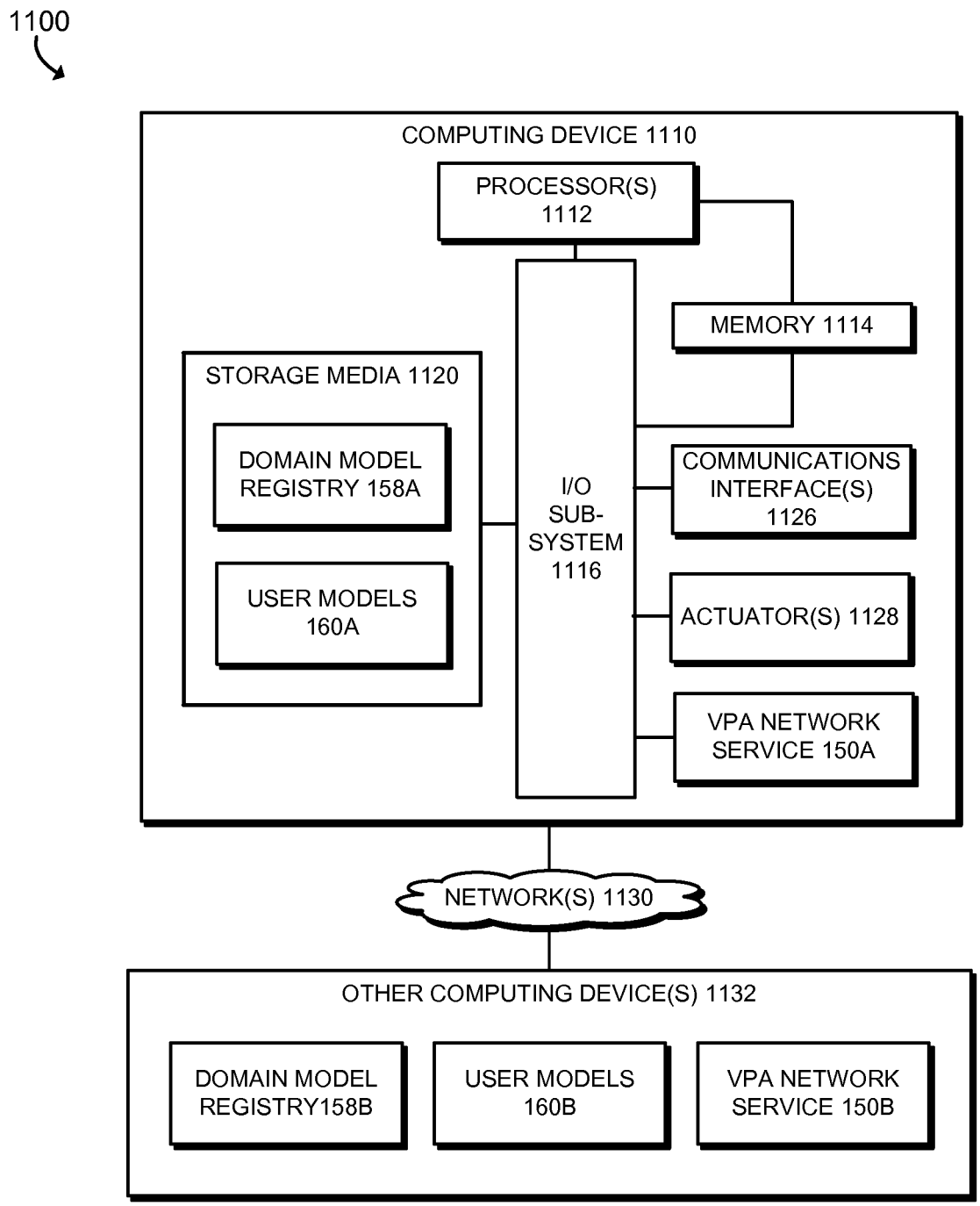
FIG. 11 is a simplified block diagram of at least one embodiment of a hardware environment for a platform including the VPA network service of the computing system of FIG. 1.

Referring now to FIG. 11, a simplified block diagram of an exemplary hardware environment 1100 for the computing system 100, in which the VPA network service 150 may be embodied, is shown. The illustrative environment 1100 includes a computing device 1110, which may be in communication with one or more other computing devices 1132 via one or more networks 1130. Illustratively, a portion 150A of the VPA network service 150 is local to the computing device 1110, while another portion 150B is distributed across one or more of the other computing systems or devices 1132 that are connected to the network(s) 1130.

In some embodiments, portions of the VPA network service 150 may be stored locally while other portions thereof are distributed across a network (and likewise for other components of the VPA network service 150). In some embodiments, however, the VPA network service 150 may be located entirely on the computing device 1110. In some embodiments, portions of the VPA network service 150 may be incorporated into other systems or interactive software applications. Such applications or systems may include, for example, operating systems, middleware or framework (e.g., application programming interface or API) software, and/or user-level applications software (e.g., another interactive software application, such as a search engine, web browser or web site application, or a user interface for a computing device).

The illustrative computing device 1110 includes at least one processor 1112 (e.g. a controller, microprocessor, microcontroller, digital signal processor, etc.), memory 1114, and an input/output (I/O) subsystem 1116. The computing device 1110 may be embodied as any type of computing device such as a personal computer or mobile device (e.g., desktop, laptop, tablet, smart phone, body-mounted device, etc.), a server, an enterprise computer system, a network of computers, a combination of computers and other electronic devices, or other electronic devices. Although not specifically shown, it should be understood that the I/O subsystem 1116 typically includes, among other things, an I/O controller, a memory controller, and one or more I/O ports. The processor 1112 and the I/O subsystem 1116 are communicatively coupled to the memory 1114. The memory 1114 may be embodied as any type of suitable computer memory device (e.g., volatile memory such as various forms of random access memory).

The I/O subsystem 1116 is communicatively coupled to a number of components including one or more storage media 1120, one or more communications interfaces 1126, and one or more actuators 1128, as well as the VPA network service 150A. The storage media 1120 may include one or more hard drives or other suitable persistent data storage devices (e.g., flash memory, memory cards, memory sticks, and/or others). Illustratively, portions of the domain model registry 158A and the user models 160A reside in the storage media 1120, while other portions of the domain model registry 158B and user models 160B reside in storage media of one or more other computing devices 1132. In other embodiments, one or more of these components may reside entirely on the computing device 1110 or on another computing device 1132.

In some embodiments, portions of systems software (e.g., an operating system, etc.), framework/middleware (e.g., APIs, object libraries, etc.), and/or the VPA network service 150 reside at least temporarily in the storage media 1120. Portions of systems software, framework/middleware, and/or the VPA network service 150 (including the domain model registry 158 and the user models 160) may be copied to the memory 1114 during operation of the computing device 1110, for faster processing or other reasons.

The communications interfaces 1126 may communicatively couple the computing device 1110 to one or more local area networks, wide area networks, personal clouds, enterprise clouds, public clouds, and/or to the Internet, for example. Accordingly, the communications interfaces 1126 may include one or more wired or wireless network interface software, hardware, or firmware, for example, as may be needed pursuant to the specifications and/or design of the particular computing system 100. Each of the other computing device(s) 1132 may be embodied as any suitable type of computing system or device such as any of the aforementioned types of devices or other electronic devices or systems. For example, in some embodiments, the other computing devices 1132 may include one or more server computers used to store portions of the domain model registry 158 and the user models 160.

The actuator(s) 1128 may include electrical, electromechanical, and/or other components, for example, that may be in communication with the VPA 112 and/or the VPA network service 150 to effectuate a response to VPA/user dialog. For example, in a vehicle-based VPA, the actuator(s) 1128 may include components such as temperature controls, media/infotainment controls, etc., that may be driven by a microcontroller or microprocessor-based subsystem that interfaces with the VPA and/or the VPA network service 150, to enable control of such components in response to dialog with the VPA user. Similarly, in a home-based VPA, the actuator(s) 1128 may include, for example, smart meters for temperature control, door locking/unlocking mechanisms, and/or others. The computing system 100 may include other components, sub-components, and devices not illustrated in FIG. 11 for clarity of the description. In general, the components of the computing system 100 are communicatively coupled as shown in FIG. 11 by electronic signal paths, which may be embodied as any type of wired or wireless signal paths capable of facilitating communication between the respective devices and components.

ADDITIONAL EXAMPLES

According to at least one aspect of this disclosure, a virtual personal assistant ("VPA") computer application is embodied in one or more machine-accessible storage media. The VPA includes a user interface through which a conversational natural language dialog involving a user and one or more computing devices may be conducted to provide information or a service to the user with the VPA, and a VPA engine. The VPA engine is configured to handle a first portion of user-supplied natural language dialog input received by the VPA through the user interface by interpreting the first portion of the user-supplied natural language dialog input, executing a first task flow based on the interpretation of the first portion of the user-supplied natural language dialog input, and supplying a response to the first portion of the user-supplied natural language dialog input as a result of the executing the first task flow. The VPA engine is also configured to send a second portion of the user-supplied natural language dialog input to a selected VPA for the selected VPA to handle by interpreting the second portion of the user-supplied natural language dialog input, executing a second task flow based on the interpretation of the second portion of the user-supplied natural language dialog input, and supplying a response to the second portion of the user-supplied natural language dialog input as a result of the executing of the second task flow. The VPA also includes a cross-VPA dialog manager to monitor the handling of the first portion of the user-supplied natural language dialog input by the VPA and monitor the handling of the second portion of the user-supplied natural language dialog input by the selected VPA. The VPA also includes a VPA-to-VPA communication interface to communicate with the selected VPA regarding the handling of the second portion of the user-supplied natural language dialog input.

In some embodiments, the VPA engine may determine content of the second portion of the user-supplied natural language dialog input and selects the selected VPA based on the determined content of the second portion of the user-supplied natural language dialog input. In some embodiments, the VPA engine may select the selected VPA based on the user's history of natural language dialog with the VPA and the user's history of natural language dialog with the selected VPA. In some embodiments, the VPA may be configured such that in response to the monitoring by the cross-VPA dialog manager, the VPA engine selects another VPA other than the selected VPA to handle the second portion of the user-supplied natural language dialog input. In some embodiments, the VPA and the selected VPA may include different types of VPA applications. In some embodiments, the VPA and the selected VPA may reside on different electronic devices.

According to at least one aspect of this disclosure, a computerized virtual personal assistant ("VPA") network service enabling communication between two or more VPAs is embodied in one or more machine accessible storage media. The VPA network service is configured to: receive a request from a first VPA to establish a communication connection with a second VPA, where the first and second VPAs belonging to a network of VPAs managed by the VPA network service, at least the first and second VPAs are configured to receive user-supplied natural language dialog input, and at least the first VPA is further configured to determine a user intent representing an interpretation of the user-supplied natural language dialog input and conduct a conversational natural language dialog with the user to provide a service or information to the user in response to the user intent. The VPA network service is also configured to query a VPA directory service to validate the request and determine pairing information, where the pairing information enables the first VPA to establish the communication connection with the second VPA; transmit the determined pairing information to the first VPA; and monitor communications between the first VPA and the second VPA to determine if the response to the user intent is complete.

In some embodiments, the VPA network service may be configured to verify that the user has permission to use the second VPA. In some embodiments, the VPA network service may be configured to verify that the first and second VPAs are permitted to communicate with each other. In some embodiments, the VPA network service may be configured to notify the first VPA if the second VPA is unable to complete the response to the user intent. In some embodiments, the directory service may include pairing information for all of the two or more VPAs and the VPA network service may be configured to monitor pairing activity of the two or more VPAs over time and maintain the directory service by adding and deleting pairing information based on the pairing activity. In some embodiments, the directory service may include information to enable communication between different types of VPA applications. In some embodiments, the directory service enables communication between a first domain specific VPA that enables conversational natural language dialog relating to a first domain and a second domain specific VPA that enables conversational natural language dialog relating to a second domain that is different than the first domain. In some embodiments, the VPA network service may analyze the request received from the first VPA and determine the second VPA to pair with the first VPA based on the request.

According to at least one aspect of this disclosure, a computerized virtual personal assistant ("VPA") network includes: a plurality of selectively networked VPA applications, each of the VPA applications configured to receive messages including user-supplied natural language dialog input, at least one of the VPA applications configured to determine a portion of the user-supplied natural language dialog input needing a response by one of the other VPA applications in the VPA network; a VPA network model including data accessible to the VPA applications to determine two of the VPA applications between which to establish a communication connection to handle the portion of the user-supplied natural language dialog input needing a response; and a VPA directory service including data accessible to the VPA applications to establish the communication connection between the two VPA applications. In some embodiments, the determined two VPA applications may be different types of VPA applications. In some embodiments, the VPA applications may be networked in a hierarchical fashion in which communication connections may be established between some of the VPA applications and not established between others of the VPA applications. In some embodiments, the VPA network model may define permitted or unpermitted communication connections between the VPA applications. In some embodiments, the determined two VPA applications may include a user-personal VPA application networked with another of the VPA applications. In some embodiments, the VPA network model may include user-personal information to determine the two of the VPA applications between which to establish a communication connection.

According to at least one aspect of this disclosure, a method for conducting a conversational natural language dialog between a user and one or more virtual personal assistant (VPA) computer applications to provide information or a service to the user via a computing device includes, with the computing device: conducting a first portion of the natural language dialog with a first VPA, where the first portion of the dialog includes a user-supplied natural language dialog input received by the first VPA; communicating with a second VPA to conduct a second portion of the natural language dialog, where the second portion of the natural language dialog includes natural language dialog supplied by the second VPA in response to the user-supplied natural language dialog input received by the first VPA; and coordinating communications between the first VPA and the second VPA to present the natural language dialog supplied by the second VPA to the user.

In some embodiments, the method may include interpreting the user-supplied natural language dialog input received by the first VPA with the first VPA, generating a structured representation of the interpretation of the user-supplied natural language dialog input with the first VPA, and communicating the structured representation of the interpretation of the user-supplied natural language dialog input to the second VPA. In some embodiments, the method may include communicating the user-supplied natural language dialog input received by the first VPA to the second VPA, and interpreting the user-supplied natural language dialog input with the second VPA. In some embodiments, the method may include presenting the natural language dialog supplied by the second VPA to the user with the second VPA. In some embodiments, the method may include sending the natural language dialog supplied by the second VPA to the first VPA and presenting the natural language dialog supplied by the second VPA to the user with the first VPA. In some embodiments, the method may include communicating a status of the second portion of the natural language dialog from the second VPA to the first VPA. In some embodiments, The method may include conducting the second portion of the natural language dialog with the second VPA and communicating information obtained by the second VPA during the second portion of the natural language dialog to the first VPA.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method, comprising:
    receiving an input from a first virtual assistant application of a first device;
    using the input, identifying a second virtual assistant application;
    determining pairing data;
    transmitting the pairing data to the first virtual assistant application for the first virtual assistant application to establish a communicative coupling between the first virtual assistant application and the second virtual assistant application;
    wherein the second virtual assistant application is to, in response to the input, generate an output intent or cause a second device to present output;
    wherein the method is performed by one or more computing devices.

2. The method of claim 1, wherein the input comprises any one or more of the following: a dialog request message, an input intent, a text string, natural language dialog, a network address, a device identifier.

3. The method of claim 1, wherein the pairing data is usable to establish the communicative coupling using any one or more of the following: a cellular network, a telephone network, a local area network, a wide area network, a public network, the Internet, a short-range wireless network, a Wi-Fi connection, a near-field communication (NFC) connection, an optical communication connection, a BLUETOOTH connection.

4. The method of claim 1, wherein the first virtual assistant application is a general-purpose application and the second virtual assistant application is a domain-specific application or the first virtual assistant application is a first domain-specific virtual assistant application and the second virtual assistant application is a second domain-specific virtual assistant application.

5. The method of claim 1, comprising, in response to the input, enabling access, by the first virtual assistant application, to a domain-specific model or a user preference model or a domain-specific task flow or user preference task flow.

6. The method of claim 1, wherein the communicative coupling comprises a direct communication connection between the first virtual assistant application and the second virtual assistant application or a communicative coupling of more than two virtual assistant applications.

7. The method of claim 1, wherein the input is received from the first virtual assistant application and the pairing data is transmitted to the first virtual assistant application using an application program interface (API).

8. The method of claim 1, comprising executing a communication protocol over the communicative coupling and monitoring communications between the first virtual assistant application and the second virtual assistant application using the communication protocol.

9. The method of claim 1, comprising any one or more of the following: determining the second virtual assistant application by querying a directory service, adding a new virtual assistant application to the directory service, removing a virtual assistant application from the directory service, generating statistics relating to activity levels of virtual assistant applications that are registered with the directory service.

10. The method of claim 1, wherein the first and second virtual assistant applications comprise, individually or in combination, any one or more of the following: an e-commerce application, a website, a user-personal virtual assistant application, a device-based virtual assistant application, a hierarchical network of virtual assistants, a home-based virtual assistant application, a heating, ventilation and cooling (HVAC) virtual assistant application, a single-user virtual assistant application, a multiple-user virtual assistant application, a single domain virtual assistant application, a multiple-domain virtual assistant application, a military virtual assistant application, a business virtual assistant application, a family virtual assistant application, a social virtual assistant application, an entertainment virtual assistant application.

11. A computer-program product embodied in one or more non-transitory machine-readable storage medium, including instructions that, when executed by one or more processors, cause the one or more processors to perform operations comprising:
receiving an input from a first virtual assistant application of a first device;
using the input, identifying a second virtual assistant application;
determining pairing data;
transmitting the pairing data to the first virtual assistant application for the first virtual assistant application to establish a communicative coupling between the first virtual assistant application and the second virtual assistant application;
wherein the second virtual assistant application is to, in response to the input, generate an output intent or cause a second device to present output.

12. The computer-program product of claim 11, wherein the input comprises any one or more of the following: a dialog request message, an input intent, a text string, natural language dialog, a network address, a device identifier.

13. The computer-program product of claim 11, wherein the pairing data is usable to establish the communicative coupling using any one or more of the following: a cellular network, a telephone network, a local area network, a wide area network, a public network, the Internet, a short-range wireless network, a Wi-Fi connection, a near-field communication (NFC) connection, an optical communication connection, a BLUETOOTH connection.

14. The computer-program product of claim 11, wherein the first virtual assistant application is a general-purpose application and the second virtual assistant application is a domain-specific application or the first virtual assistant application is a first domain-specific virtual assistant application and the second virtual assistant application is a second domain-specific virtual assistant application.

15. The computer-program product of claim 11, wherein the instructions, when executed by one or more processors, cause the one or more processors to perform operations comprising, in response to the input, enabling access, by the first virtual assistant application, to a domain-specific model or a user preference model or a domain-specific task flow or user preference task flow.

16. The computer-program product of claim 11, wherein the communicative coupling comprises a direct communication connection between the first virtual assistant application and the second virtual assistant application or a communicative coupling of more than two virtual assistant applications.

17. The computer-program product of claim 11, wherein the input is received from the first virtual assistant application and the pairing data is transmitted to the first virtual assistant application using an application program interface (API).

18. The computer-program product of claim 11, wherein the instructions, when executed by one or more processors, cause the one or more processors to perform operations comprising executing a communication protocol over the communicative coupling and monitoring communications between the first virtual assistant application and the second virtual assistant application using the communication protocol.

19. The computer-program product of claim 11, wherein the instructions, when executed by one or more processors, cause the one or more processors to perform operations comprising any one or more of the following: determining the second virtual assistant application by querying a directory service, adding a new virtual assistant application to the directory service, removing a virtual assistant application from the directory service, generating statistics relating to activity levels of virtual assistant applications that are registered with the directory service.

20. The computer-program product of claim 11, wherein the first and second virtual assistant applications comprise, individually or in combination, any one or more of the following: an e-commerce application, a website, a user-personal virtual assistant application, a device-based virtual assistant application, a hierarchical network of virtual assistants, a home-based virtual assistant application, a heating, ventilation and cooling (HVAC) virtual assistant application, a single-user virtual assistant application, a multiple-user virtual assistant application, a single domain virtual assistant application, a multiple-domain virtual assistant application, a military virtual assistant application, a business virtual assistant application, a family virtual assistant application, a social virtual assistant application, an entertainment virtual assistant application.

21. A system, comprising:
at least one processor; and
memory coupled to the at least one processor and storing instructions that when executed by the at least one processor cause the system to be capable of:
receiving an input from a first virtual assistant application of a first device;
using the input, identifying a second virtual assistant application;
determining pairing data comprising information to establish a pairing with the second virtual assistant application;
transmitting the pairing data to the first virtual assistant application for the first virtual assistant application to establish a communicative coupling between the first virtual assistant application and the second virtual assistant application to transmit information between the first virtual assistant application and the second virtual assistant application via the pairing;
wherein the second virtual assistant application is to, in response to the input, generate an output intent or cause a second device to present output;
wherein the method is performed by one or more computing devices.

* * * * *